US011528769B2

(12) United States Patent
Cheng et al.

(10) Patent No.: US 11,528,769 B2
(45) Date of Patent: Dec. 13, 2022

(54) UNICAST LINK RADIO LINK FAILURE DETECTION AND MANAGEMENT

(71) Applicant: QUALCOMM Incorporated, San Diego, CA (US)

(72) Inventors: Hong Cheng, Basking Ridge, NJ (US); Dan Vassilovski, Del Mar, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/118,806

(22) Filed: Dec. 11, 2020

(65) Prior Publication Data

US 2021/0195677 A1 Jun. 24, 2021

Related U.S. Application Data

(60) Provisional application No. 62/951,771, filed on Dec. 20, 2019.

(51) Int. Cl.
*H04W 76/19* (2018.01)
*H04W 76/25* (2018.01)

(52) U.S. Cl.
CPC .......... *H04W 76/19* (2018.02); *H04W 76/25* (2018.02)

(58) Field of Classification Search
CPC ...... H04W 76/19; H04W 76/23; H04W 76/25
See application file for complete search history.

(56) References Cited

U.S. PATENT DOCUMENTS

| 2018/0255499 | A1* | 9/2018 | Loehr | H04W 76/23 |
| 2019/0082495 | A1* | 3/2019 | Kim | H04W 76/10 |
| 2019/0124015 | A1* | 4/2019 | Loehr | H04W 72/02 |
| 2020/0229007 | A1* | 7/2020 | Jung | H04W 72/04 |
| 2022/0015167 | A1* | 1/2022 | Kim | H04W 76/38 |
| 2022/0029691 | A1* | 1/2022 | Yu | H04W 88/08 |

OTHER PUBLICATIONS

3rd Generation Partnership Project; Technical Specification Group Core Network and Terminals; Proximity-services (ProSe) User Equipment (UE) to ProSe function protocol aspects; Stage 3 (Release 15). 3GPP TS 24.334 V15.2.0 (Sep. 2018) (Year: 2018).*
APPLE: "Summary of [104#56][NR/2X] AS Level Link Management for Unicast", 3GPP Draft, R2-1901900, 3GPP TSG-RAN WG2 Meeting #105, 3rd Generation Partnership Project (3GPP), Mobile Competence Centre, 650, Route Des Lucioles, F-06921 Sophia-Antipolis Cedex, France, Mar. 1, 2019 (Mar. 1, 2019), 27 Pages, XP051603249, Erricsson contribute, p. 14, Q9, p. 20 ZTE Contribution, p. 21 Rapporteur Summary, p. 25 Interdigital Contribution, p. 24.

(Continued)

*Primary Examiner* — Kashif Siddiqui
(74) *Attorney, Agent, or Firm* — Qualcomm Incorporated

(57) ABSTRACT

Methods, systems, and devices for wireless communications are described. A first user equipment (UE) may establish a sidelink connection with a second UE, where the sidelink connection is associated with a plurality of flows. The first UE may determine, based on monitoring each flow of the plurality of flows, a radio link status of the sidelink connection. The first UE may transmit, based on the determining, a non-access stratum layer message to the second UE based at least on the radio link status of the sidelink connection.

24 Claims, 14 Drawing Sheets

(56) References Cited

OTHER PUBLICATIONS

Ericsson: "RLF Handling in Sidelink", 3GPP Draft, 3GPP TSG-RAN WG2 #107, R2-1910133—RLF Handling in Sidellnk. 3rd Generation Partnership Project (3GPP), Mobile Competence Centre, 650, Route Des Lucioles, F-06921, Sophia-Antipolis Cedex, France, vol. RAN WG2, No. Prague. Czech Republic, Aug. 26, 2019-Aug. 30, 2019, Aug. 15, 2019 (Aug. 15, 2019), XP051767914, 6 Pages, Retrieved from the Internet: URL:http://www.3gpp.org/ftp/tsg_ran/WG2_RL2/TSGR2_107/Docs/R2-1910133.zip [retrieved on Aug. 15, 2019] Paragraphs [0001]-[02 .1], Proposal 1.

Interdigital Inc: "RLM/RLF and RRM for NR V2X", 3GPP Draft, 3GPP RAN WG2 Meeting #105, R2-1901579 (R16 V2X SI A11421 RLM_RLF), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602934, 4 Pages, Retrieved from the Internet: URL: http://www.3gpp.org/ftp/tsg%5Fran/WG2%5FRL2/TSGR2%5F105/Docs/R2%2D1901579%2Ezip, [retrieved on Feb. 15, 2019], p. 4, Section 2, Proposals 1.4.

International Search Report and Written Opinion—PCT/US2020/064911—ISA/EPO—dated Mar. 23, 2021.

SAMSUNG: "Interaction Between AS Layer and Upper layer upon SL RLM/RLF Declaration for NR V2X Unicast", 3GPP Draft, R2-1905127, 3GPP TSG-RAN WG2 Meeting #105bis, 3rd Generation Partnership Project (3GPP), Mobile Competence Centre, 650, Route Des Lucioles, F-06921 Sophia-Antipolis Cedex, France vol. RAN WG2. No. Xi'an China, Apr. 8, 2019-Apr. 12, 2019, Apr. 6, 2019 (Apr. 6, 2019), XP051702403, 2 Pages, Retrieved from the Internet: URL:http://www.3gpp.org/ftp/Meetings%5F3GPP%5FSYNC/RAN2/Docs/R2%2D1905127%2Ezip [retrieved on Apr. 6, 2019] Paragraph [0002].

VIVO: "Open Issues for Sidelink Link Failure and Release", 3GPP Draft, 3GPP TSG-RAN WG2 Meeting #106, R2-1905845_Open Issues for Sidelink Link Failure and Release, 3rd Generation Partnership Project (3GPP), Mobile Competence Centre, 650, Route Des Lucioles, F-06921, Sophia-Antipolis Cedex, vol. RAN WG2, No. Reno, USA, May 13, 2019-May 17, 2019, May 13, 2019 (May 13, 2019), XP051729343, 3 Pages, Retrieved from the Internet: URL:http://www.3gpp.org/ftp/Meetings%5F3GPP%5FSYNC/RAN2/Docs/R2%2D1905845%2Ezip [retrieved on May 13, 2019] pp. 1-3, p. 1, Last Paragraph Proposal 1.

* cited by examiner

UNICAST LINK RADIO LINK FAILURE DETECTION AND MANAGEMENT

CROSS REFERENCE

The present application for patent claims the benefit of U.S. Provisional Patent Application No. 62/951,771 by Cheng et al., entitled "UNICAST LINK RADIO LINK FAILURE DETECTION AND MANAGEMENT," filed Dec. 20, 2019, assigned to the assignee hereof, and expressly incorporated by reference in its entirety herein.

BACKGROUND

The following relates generally to wireless communications, and more specifically to unicast link radio link failure (RLF) detection and management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support unicast link radio link failure (RLF) detection and management. Generally, the described techniques provide various mechanisms that support wireless communications in a wireless network. Broadly, aspects of the described techniques implement radio link management (RLM)/radio link failure (RLF) detection over a sidelink channel. For example, two user equipment (UE) may be communicating over a sidelink channel. The sidelink connection may include a plurality of flows being used for data communications between the UEs. A flow broadly refers to data communicated over separate data radio bearers (DRBs), having different quality-of-service (QoS) requirements, and the like. Each UE may respectively monitor communications over each flow in order to determine the radio link status of the sidelink connections. For example, each UE may monitor for acknowledgment messages associated with communications performed over each flow, may monitor the amount of data being communicated over each flow according to a time period, or otherwise determine whether or not the data is being communicated across each flow in an acceptable manner and satisfying an associated QoS requirement. The UEs may exchange non-access stratum (NAS) layer messages and/or access stratum (AS) messages based on the radio link status of the sidelink connection. For example, a UE may determine that at least one of the flows has no data being communicated, e.g., based on a lack of acknowledgment messages, based on an inactivity timer, based on failing to satisfy the QoS requirement for the flow, and the like.

Generally, the lack of data being communicated over a flow may trigger a concern that the sidelink channel has degraded to below an acceptable performance level and/or has dropped (e.g., is experiencing RLF). Accordingly, rather than simply declaring a RLF, the UE may determine whether data is being communicated across the other flow(s) of the sidelink connection. If data is being communicated over at least one other flow of the sidelink connection, this may indicate that the sidelink connection has not failed, but may have degraded to a degree and therefore various parameters for the sidelink channel may be updated. In this situation, the UE may transmit a message (e.g., a NAS message and/or an AS message) to the other UE updating or otherwise reconfiguring parameters for the sidelink connection, e.g., updating the QoS parameters, selecting a new configuration for the sidelink connection, etc. If the UE determines that no data is being communicated across the other flow(s), this may indicate that the sidelink connection has failed and/or more significantly degraded. In this situation, the UE may transmit a keep alive message to the other UE over the sidelink channel (e.g., using a signaling radio bearer (SRB) and/or one or more DRBs of the sidelink connection) requesting confirmation that the sidelink connection is active. If a response to the keep alive message indicates that the sidelink connection is active, the UE may dismiss the lack of communications on the particular flow and/or transmit a message (e.g., a NAS and/or AS message) to the other UE reconfiguring various parameters for the sidelink connection. If no response to the keep alive message is received from the other UE, the UE may determine that the sidelink connection has failed, and therefore teardown that connection and begin an RLF recovery procedure. These techniques improve link management for the sidelink connection between UEs, avoid unnecessary RLF declaration (e.g., unnecessarily tearing down the sidelink connection and having to rebuild a new sidelink connection), and the like.

A method of wireless communication at a first UE is described. The method may include establishing a sidelink connection with a second UE, where the sidelink connection is associated with a set of flows, determining, based on monitoring each flow of the set of flows, a radio link status of the sidelink connection, and transmitting, based on the determining, a non-access stratum layer message to the second UE based at least on the radio link status of the sidelink connection.

An apparatus for wireless communication at a first UE is described. The apparatus may include a processor, memory coupled with the processor, and instructions stored in the memory. The instructions may be executable by the processor to cause the apparatus to establish a sidelink connection with a second UE, where the sidelink connection is associated with a set of flows, determine, based on monitoring each flow of the set of flows, a radio link status of the sidelink connection, and transmit, based on the determining, a non-access stratum layer message to the second UE based at least on the radio link status of the sidelink connection.

Another apparatus for wireless communication at a first UE is described. The apparatus may include means for establishing a sidelink connection with a second UE, where the sidelink connection is associated with a set of flows, determining, based on monitoring each flow of the set of flows, a radio link status of the sidelink connection, and transmitting, based on the determining, a non-access stratum layer message to the second UE based at least on the radio link status of the sidelink connection.

A non-transitory computer-readable medium storing code for wireless communication at a first UE is described. The code may include instructions executable by a processor to establish a sidelink connection with a second UE, where the sidelink connection is associated with a set of flows, determine, based on monitoring each flow of the set of flows, a radio link status of the sidelink connection, and transmit, based on the determining, a non-access stratum layer message to the second UE based at least on the radio link status of the sidelink connection.

Some examples of the method, apparatuses, and non-transitory computer-readable medium described herein may further include operations, features, means, or instructions for determining that no data may be communicated across a first flow of the set of flows, and transmitting the non-access stratum layer message to the second UE, where the non-access stratum layer message includes a keep-alive message requesting confirmation from the second UE that the radio link status of the sidelink connection may be active.

Some examples of the method, apparatuses, and non-transitory computer-readable medium described herein may further include operations, features, means, or instructions for receiving a response message from the second UE indicating that the radio link status of the sidelink connection with the second UE may be active, and transmitting, based on the response message, a second message to the second UE reconfiguring one or more parameters of the sidelink connection.

In some examples of the method, apparatuses, and non-transitory computer-readable medium described herein, reconfiguring one or more parameters of the sidelink connection may include operations, features, means, or instructions for reconfiguring the sidelink connection from a first configuration to a second configuration from a set of available configurations configured for the sidelink connection.

In some examples of the method, apparatuses, and non-transitory computer-readable medium described herein, reconfiguring one or more parameters of the sidelink connection may include operations, features, means, or instructions for reconfiguring one or more quality of service parameters configured for the sidelink connection.

Some examples of the method, apparatuses, and non-transitory computer-readable medium described herein may further include operations, features, means, or instructions for determining, based on a lack of a response message from the second UE, that the radio link status of the sidelink connection with the second UE includes a radio link failure, and performing, based on the radio link failure, a radio link failure recovery procedure to establish a second sidelink connection with the second UE.

In some examples of the method, apparatuses, and non-transitory computer-readable medium described herein, determining that no data may be communicated may include operations, features, means, or instructions for determining that data communicated across the first flow fails to satisfy a quality of service requirement associated with the first flow.

In some examples of the method, apparatuses, and non-transitory computer-readable medium described herein, determining that no data may be communicated may include operations, features, means, or instructions for determining that no data may have been communicated across the first flow for a threshold time period associated with the first flow.

Some examples of the method, apparatuses, and non-transitory computer-readable medium described herein may further include operations, features, means, or instructions for determining that no data may be communicated across a first flow of the set of flows, determining that data may be communicated across a second flow of the set of flows, determining that the radio link status of the sidelink connection includes a degraded radio link status, and transmitting a second message to the second UE reconfiguring one or more parameters of the sidelink connection.

In some examples of the method, apparatuses, and non-transitory computer-readable medium described herein, reconfiguring one or more parameters of the sidelink connection may include operations, features, means, or instructions for reconfiguring the sidelink connection from a first configuration to a second configuration from a set of available configurations configured for the sidelink connection.

In some examples of the method, apparatuses, and non-transitory computer-readable medium described herein, reconfiguring one or more parameters of the sidelink connection may include operations, features, means, or instructions for reconfiguring one or more quality of service parameters configured for the sidelink connection.

Some examples of the method, apparatuses, and non-transitory computer-readable medium described herein may further include operations, features, means, or instructions for determining that the non-access stratum layer message was transmitted within a threshold time period, and refraining from transmitting a second non-access stratum layer message to the second UE based at least on the non-access stratum layer message.

In some examples of the method, apparatuses, and non-transitory computer-readable medium described herein, determining the radio link status of the sidelink connection may include operations, features, means, or instructions for determining, for each flow of the set of flows, whether data communicated across each flow satisfies a quality of service requirement configured for the flow.

In some examples of the method, apparatuses, and non-transitory computer-readable medium described herein, the non-access stratum layer message includes a PC5 sidelink (PC5-S) message.

A method of wireless communication at a second UE is described. The method may include establishing a sidelink connection with a first UE, where the sidelink connection is associated with a set of flows, receiving a non-access stratum layer message from the first UE indicating a radio link status of the sidelink connection, where the non-access stratum layer message is based on a status at the first UE of each flow of the set of flows, and transmitting a response message to the first UE indicating that the radio link status of the sidelink connection with the first UE is active.

An apparatus for wireless communication at a second UE is described. The apparatus may include a processor, memory coupled with the processor, and instructions stored in the memory. The instructions may be executable by the processor to cause the apparatus to establish a sidelink connection with a first UE, where the sidelink connection is associated with a set of flows, receive a non-access stratum layer message from the first UE indicating a radio link status of the sidelink connection, where the non-access stratum layer message is based on a status at the first UE of each flow of the set of flows, and transmit a response message to the first UE indicating that the radio link status of the sidelink connection with the first UE is active.

Another apparatus for wireless communication at a second UE is described. The apparatus may include means for establishing a sidelink connection with a first UE, where the sidelink connection is associated with a set of flows, receiving a non-access stratum layer message from the first UE indicating a radio link status of the sidelink connection, where the non-access stratum layer message is based on a status at the first UE of each flow of the set of flows, and transmitting a response message to the first UE indicating that the radio link status of the sidelink connection with the first UE is active.

A non-transitory computer-readable medium storing code for wireless communication at a second UE is described. The code may include instructions executable by a processor to establish a sidelink connection with a first UE, where the sidelink connection is associated with a set of flows, receive a non-access stratum layer message from the first UE indicating a radio link status of the sidelink connection, where the non-access stratum layer message is based on a status at the first UE of each flow of the set of flows, and transmit a response message to the first UE indicating that the radio link status of the sidelink connection with the first UE is active.

Some examples of the method, apparatuses, and non-transitory computer-readable medium described herein may further include operations, features, means, or instructions for receiving, based on the response message, a second message from the first UE reconfiguring one or more parameters of the sidelink connection, and reconfiguring the one or more parameters of the sidelink connection based at least on part on the second message.

In some examples of the method, apparatuses, and non-transitory computer-readable medium described herein, reconfiguring one or more parameters of the sidelink connection may include operations, features, means, or instructions for reconfiguring the sidelink connection from a first configuration to a second configuration from a set of available configurations configured for the sidelink connection.

In some examples of the method, apparatuses, and non-transitory computer-readable medium described herein, reconfiguring one or more parameters of the sidelink connection may include operations, features, means, or instructions for reconfiguring one or more quality of service parameters configured for the sidelink connection.

In some examples of the method, apparatuses, and non-transitory computer-readable medium described herein, the non-access stratum layer message includes a keep-alive message requesting confirmation from the second UE that the radio link status of the sidelink connection may be active.

DETAILED DESCRIPTION

Figure 1:
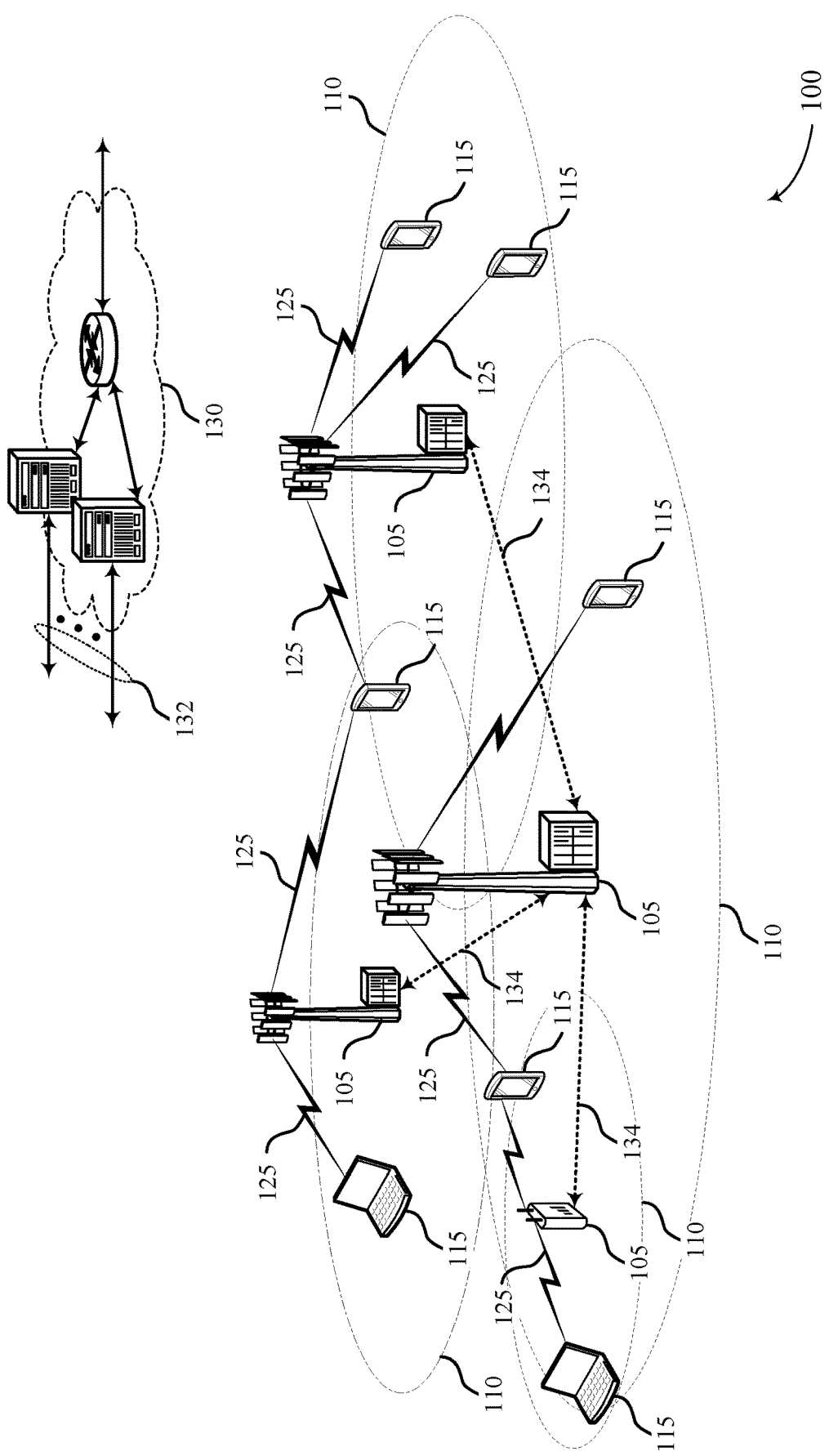
FIG. 1 illustrates an example of a system for wireless communications that supports unicast link radio link failure (RLF) detection and management in accordance with aspects of the present disclosure.

Wireless communication systems may use different interfaces to support wireless communications between devices. For example, a Uu interface may be used to support wireless communications between a base station and a user equipment (UE). A PC5 interface may be used to support wireless communications between UEs. Each interface type is unique in terms of configurations, requirements, etc. For example, two UEs may establish a sidelink connection over a PC5 interface, with the sidelink connection supporting multiple flows. A flow broadly refers to data communicated over separate data radio bearers (DRBs), data communicated having different quality-of-service (QoS) requirements, and the like. Some wireless communication systems are configured such that no access stratum (AS) layer signaling can be used for radio link management (RLM)/radio link failure (RLF). Moreover, such wireless communication systems may also be configured such that there is no receiver side lower layer indication supported for RLF. Accordingly, this may result in UEs communicating over a sidelink channel having no effective or efficient means of managing the sidelink connection. In some aspects, this may mean that the UEs unnecessarily declare RLF for the sidelink connection in the situation where the link is still active, but may have degraded to some degree. Unnecessarily declaring RLF means that considerable resources and time are wasted tearing down the sidelink connection and then rebuilding a new sidelink connection.

Aspects of the disclosure are initially described in the context of a wireless communication system. Broadly, aspects of the described techniques implement RLM/RLF detection over a sidelink channel. For example, two UE may be communicating over a sidelink channel. The sidelink connection may include a plurality of flows being used for data communications between the UEs. A flow broadly refers to data communicated over separate DRBs, having different QoS requirements, and the like. Each UE may respectively monitor communications over each flow in order to determine the radio link status of the sidelink connections. For example, each UE may monitor for acknowledgment messages associated with communications performed over each flow, may monitor the amount of data being communicated over each flow according to a time period, or otherwise may determine whether or not the data is being communicated across each flow in an acceptable manner and satisfying an associated QoS requirement. The UEs may exchange NAS layer messages and/or AS messages based on the radio link status of the sidelink connection. For example, a UE may determine that at least one of the flows has no data being communicated, e.g., based on a lack of acknowledgment messages, based on an inactivity timer, based on failing to satisfy the QoS requirement for the flow, and the like.

Generally, the lack of data being communicated over a flow may trigger a concern that the sidelink channel has degraded to below an acceptable performance level and/or has dropped (e.g., is experiencing RLF). Accordingly and rather than simply declaring a RLF, the UE may determine whether data is being communicated across the other flow(s) of the sidelink connection. If data is being communicated, this may indicate that the sidelink connection may have degraded to a degree and therefore various parameters for the sidelink channel may be updated. In this situation, the UE may transmit a message (e.g., a NAS message and/or an AS message) to the other UE updating or otherwise reconfiguring parameters for the sidelink connection, e.g., updating the QoS parameters, selecting a new configuration for the sidelink connection, etc. In other cases, if data is being communicated across other flow(s) of the sidelink connection, the link may be operating properly and the alarm may be due to lack of application layer data to transmit for this particular flow. If the UE determines that no data is being communicated across the other flow(s), this may indicate that the sidelink connection has failed and/or more significantly degraded. In this situation, the UE may transmit a keep alive message to the other UE over the sidelink channel (e.g., using a signaling radio bearer (SRB) and/or one or more DRBs of the sidelink connection) requesting confirmation that the sidelink connection is active. If a response to the keep alive message indicates that the sidelink connection is active, the UE may dismiss the lack of communications on the particular flow and/or transmit a message (e.g., a NAS and/or AS message) to the other UE reconfiguring various parameters for the sidelink connection. If no response to the keep alive message is received from the other UE, the UE may determine that the sidelink connection has failed, and therefore teardown that connection and begin an RLF recovery procedure. These techniques improve link management for the sidelink connection between UEs, avoid unnecessary RLF declaration (e.g., unnecessarily tearing down the sidelink connection and having to rebuild a new sidelink connection), and the like.

Aspects of the disclosure are further illustrated by and described with reference to apparatus diagrams, system diagrams, and flowcharts that relate to unicast link RLF detection and management.

FIG. 1 illustrates an example of a wireless communication system 100 that supports unicast link RLF detection and management in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined or defined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 (e.g., a first UE 115) may establish a sidelink connection with a second UE 115, where the sidelink connection is associated with a plurality of flows. The UE 115 may determine, based on monitoring each flow of the plurality of flows, a radio link status of the sidelink connection. The UE 115 may transmit, based on the determining, a non-access stratum layer message to the second UE 115 based at least on the radio link status of the sidelink connection.

A UE 115 (e.g., the second UE 115) may establish a sidelink connection with a first UE 115, where the sidelink connection is associated with a plurality of flows. The UE 115 may receive a non-access stratum layer message from the first UE 115 indicating a radio link status of the sidelink connection, where the non-access stratum layer message is based on a status at the first UE of each flow of the plurality of flows. The UE 115 may transmit a response message to the first UE 115 indicating that the radio link status of the sidelink connection with the first UE 115 is active.

Figure 2:
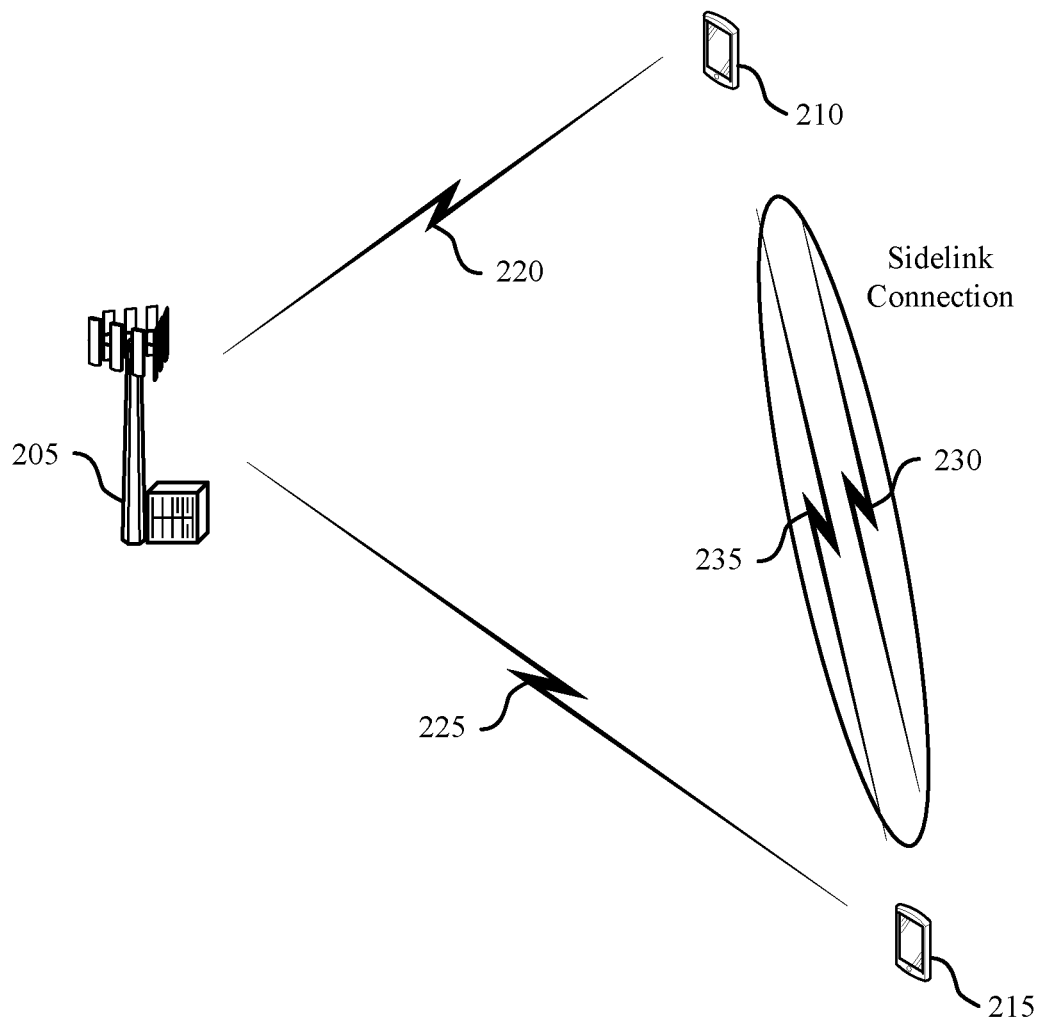
FIG. 2 illustrates an example of a wireless communication system that supports unicast link RLF detection and management in accordance with aspects of the present disclosure.

FIG. 2 illustrates an example of a wireless communication system 200 that supports unicast link RLF detection and management in accordance with aspects of the present disclosure. In some examples, wireless communication system 200 may implement aspects of wireless communication system 100. Wireless communication system 200 may include a base station 205, UE 210, and a UE 215, which may be examples of the corresponding devices described herein. In some aspects, the UE 210 and the UE 215 may be communicating over a sidelink connection.

Wireless communication systems may use different interfaces to support wireless communications between wireless devices. For example, a Uu interface may be used to support wireless communications between base station 205 and UE 210 and/or UE 215 over links 220 and/or 225, respectively. A PC5 interface may be used to support wireless communications between UE 210 and UE 215. Each interface type is unique in terms of configurations, requirements, etc. UE 210 and UE 215 may establish a sidelink connection over the PC5 interface, with the sidelink connection supporting multiple flows (with a first flow 230 and a second flow 235 being shown by way of example only). A flow broadly refers to data communicated over separate DRBs, data communicated having different QoS requirements, and the like. Some wireless communication systems are configured such that no AS layer signaling can be used for RLM/RLF. Some wireless communication systems may also be configured such that there is no receiver side lower layer indication supported for RLF. Accordingly, this may result in UEs communicating over a sidelink channel having no effective or efficient means of managing the sidelink connection. In some aspects, this may mean that the UEs unnecessarily declare RLF for the sidelink connection in the situation where the link is still active, but may have degraded some degree. Unnecessarily declaring RLF means that considerable resources and time are wasted tearing down the sidelink connection and then rebuilding a new sidelink connection.

For example, and for an NR PC5 interface, a UE may establish a layer 2 (L2) link (e.g., a sidelink connection) with the peer UE, with multiple associated QoS flows/DRBs. The traffic for the NR PC5 interfaces may be, in some examples, periodic, e.g., there is no guarantee that there will always be traffic for a particular flow. Some wireless communication systems may be configured such as there is no receiver side in-sync/out-of-sync (e.g., active or inactive) indication provided to upper layers. Some wireless communication systems may instead, rely on HARQ feedback for the link maintenance. However, when there are multiple QoS flows (e.g., mapped to DRBs), each flow may use a different configuration. Accordingly, a HARQ feedback from one QoS flow may not reflect problems for the other QoS flows. Moreover, due to aperiodic traffic, there may not be any HARQ feedbacks, which may further delay link problem detection.

Accordingly, aspects of the described techniques may include performing a PC5-RRC-based aggregation of different RLF triggers (e.g., a loss of data communicated) from the DRBs (e.g., the plurality of flows) to avoid unnecessary RLF declarations. Aspects of the described techniques utilize an efficient NAS layer keep alive mechanism to allow the detection of the RLF at the receiver and transmitter side in a reliable and resource efficient manner. In some aspects, this may take into account the unique QoS requirements of each flow (e.g., DRBs). In some aspects, this may include a PC5-RRC layer implemented at each UE aggregating different QoS flow/DRB information before triggering NAS layer actions for RLM/RLF signaling.

For example, the UE 210 and the UE 215 may establish a sidelink connection that includes, or is otherwise associated with, a plurality of flows. In the example illustrated in wireless communication system 200, the first flow 230 and the second flow 235 are illustrated. However, it is to be understood that the sidelink connection may have more than two flows. Broadly, the UE 210 and the UE 215 may monitor each flow in the sidelink connection to determine the radio link status for the sidelink connection. Although the techniques described herein are provided with reference to the UE 210 (e.g., a first UE), it is to be understood that the UE 215 (e.g., a second UE) may also be configured to implement aspects of the described techniques. The UE 210 and UE 215 may generally exchange various messages at the AS layer and/or NAS layer based on the radio link status of the sidelink connection.

For example, the UE 210 may monitor each flow configured for, or otherwise associated with, the sidelink connection to determine the radio link status. The monitoring may be based on an acknowledgment feedback information, e.g., determining whether acknowledgment or negative-acknowledgment HARQ feedback messages are received and, if so, how many of each message type is received. For example, a threshold number of negative-acknowledgement received within a time period may signal that no data is being successfully communicated over the flow. As another example, failure to receive acknowledgement or negative-acknowledgement messages for data transmitted over a flow may signal that no data is being successfully communicated over the flow.

Additionally or alternatively, the monitoring may be based on a timer associated with each flow (e.g., an inactivity timer). For example, the UE 210 may establish an inactivity timer for each flow to determine how much time has passed since data has been successfully communicated over the flow. The value or threshold for the inactivity timer may be a configured value and/or may be determined by the UE 210 based on historical information for the flow (e.g., based on the observed nature of data communicated over the flow). The UE 210 may also establish the inactivity timer for the flow based on the QoS parameters associated with the flow, e.g., the PC5 five quality indicators (PQI), the data rate, maximum data burst rate (MDBV), averaging window, etc. Expiration of the inactivity timer may signal that no data is being successfully communicated over the flow.

Additionally or alternatively, the monitoring may be based on whether data communicated over a flow satisfies the QoS configuration for the flow. For example, a threshold amount of data communicated over a flow within a time period that fails to meet the QoS configuration for the flow may signal that no data is being successfully communicated over the flow.

The UE 210 may determine, based on the monitoring, whether there is data communicated successfully across each flow in the sidelink connection, e.g., based on the inactivity timer, HARQ feedback, etc. If the UE 210 determines that there is no data being successfully communicated across the first flow 230 (as one non-limiting example), it may trigger an error indication (e.g., RLF trigger) to the PC5-RRC layer. Based on the trigger, the PC5-RRC layer of the UE 210 may query the other active flow(s) (e.g., the second flow 235 associated with the same destination, such as the L2 identifier (ID) or a L2 Link ID, with the same cast type) to determine whether there is data being successfully communicated across those flow(s). Based on the response to that query, the UE 210 may take various steps.

In one situation, UE 210 may determine that there is no data successfully communicated across the second flow 235 and/or any other flows configured in the sidelink connection. In response, the UE 210 may transmit a NAS layer message (e.g., a keep alive message or signaling) to the UE 215. Broadly, the NAS layer message may be configured to convey a request for the UE 215 to confirm that the radio link status of the sidelink connection is active. In the situation where the UE 215 receives the keep alive message, it may transmit a response message to the UE 210 indicating that the radio link status of the sidelink connection is active. For example, the UE 215 may also monitor the different flows configured for the sidelink connection to determine the radio link status from its perspective. If the response message indicates that the sidelink connection is active, this may signal or otherwise convey an indication that the sidelink connection is active, but may have degraded to some degree (e.g., due to mobility) such that the data being communicated may not fully satisfy the QoS requirement associated with the flow and/or that at least some of the data has been dropped.

Accordingly, the UE 210 and UE 215 may exchange one or more messages (e.g., at the NAS layer and/or at the AS layer) to reconfigure various parameters of the sidelink connection. For example, UE 210 and the UE 215 may select a new QoS requirement for a flow (e.g., the first flow 230 in this example experiencing the loss of data communications) from a set of available or otherwise configured QoS configurations. That is, the UE 210 and UE 215 (and/or base station 205) may configure multiple QoS configurations for the sidelink connection. The UE 210 and UE 215 may select from the QoS configurations for each flow. In the situation where communications over a flow degrade, UE 210 and UE 215 may select a new QoS configuration for the flow to improve data communications.

Additionally or alternatively, this may include modifying various NAS layer parameters associated with the QoS requirement for the flow as well. For example, UE 210 and UE 215 may adjust the transmit power level, may switch from negative-acknowledgement mode to acknowledgement mode for the flow, may adjust the Range for the flow, the Delay for the flow, may adjust the peak error rate (PER) for the flow, and the like.

Additionally or alternatively, UE 210 and the UE 215 may select a new configuration for the sidelink connection from a set of available or otherwise configured configurations for the sidelink connection. That is, UE 210 and UE 215 (and/or base station 205) may configure multiple configurations for the sidelink connection. UE 210 and UE 215 may select from the different configurations for the sidelink connection to improve data communications. Accordingly, this may enable the UE 210 and the UE 215 to more efficiently manage each flow associated with the sidelink connection in a dynamic manner.

Additionally or alternatively, this may include modifying various AS layer parameters associated with the QoS requirement for the flow as well. For example, UE 210 and UE 215 may adjust the modulation and coding scheme (MCS) for the flow, and the like.

In the situation where the UE 215 does not receive the keep alive message (and therefore cannot respond), the UE 210 may determine that no response message to the keep alive message was received from the UE 215. This may signal or otherwise convey an indication that the sidelink connection is inactive (e.g., that an RLF has occurred). Accordingly, UE 210 may initiate an RLF recovery procedure where it tears down the sidelink connection with UE 215 and begins to establish a new sidelink connection. In some aspects, this may include the UE 210 tearing down the L2 link (and releasing all associated resources) and reporting the error to the base station 205 over link 220 (e.g., using the Uu RRC SidelinkUEInfo message). Alternatively, the NAS layer may choose to perform the RLF recovery by maintaining the security associations with UE 210 and performing another discovery for the same application layer ID.

In another situation, UE 210 may determine that there is data communicated successfully across the second flow 235 and/or other flow(s) in the sidelink connection. This may indicate that the radio link status for the sidelink connection is a degraded radio link status, e.g., the sidelink connection performance has degraded to some degree, but is still suitable for wireless communications. In response, UE 210 may transmit the NAS layer message (e.g., a keep alive message) to UE 215. Broadly, the NAS layer message may be configured to convey a request from the UE 215 confirming that the radio link status of the sidelink connection is active. In this situation, UE 215 may receive the keep alive message and respond with a response message indicating that the radio link status of the sidelink connection is active. In this example, UE 210 may transmit another message (e.g., at the NAS layer and/or at the AS layer) to UE 215 reconfiguring various parameters of the sidelink connection, e.g., changing QoS parameters, selecting a new QoS configuration, selecting a new configuration for the sidelink connection, and the like.

In some aspects, transmission of the NAS layer message (e.g., the keep alive message) may be depended upon whether a previous keep alive message was transmitted within a threshold time period. That is, after determining that the first flow 230 has no data being successfully communicated, UE 210 may determine when the last keep alive message was transmitted to UE 215. If the last keep alive message was transmitted within the threshold time period, UE 210 may refrain from transmitting another keep alive message at that time. Instead, UE 210 may again determine whether data is being successfully communicated successfully across the first flow 230 after the threshold time period and, if not, then transmit a second keep alive message if needed. In some examples, the NAS layer message may be a PC5 sidelink (PC5-S) message.

In some aspects, the described techniques may support QoS parameter based RLF triggering and keep alive signaling cancellation based on the AS layer. That is, as the triggering of the error towards the NAS layer can be based on individual DRBs (e.g., flows), different configurations for the RLF triggers (e.g., the queries implemented at the PC5-RRC layer) can be configured based on the QoS of the flow. For example, for each of the DRBs, there may be an associated PQI and a corresponding QoS parameters. Accordingly, the criteria for triggering the RLF error (e.g., the query) may be determined based on various factors. For example, based on the PQI, a guaranteed bit rate flow type may have an estimated traffic periodicity, e.g., considering the bit rate, an averaging window, the typical packet size, etc. Accordingly, for different DRBs, different inactivity timers could be used to trigger the RLF indication. From the transmitter side (e.g., UE 215), based on the traffic pattern of the QoS flow (e.g., maximum data burst volume (MDBV)), UE 215 may determine that some bursty QoS flows should have a higher RLC failure count before triggering the RLF indication. The channel busy ratio (CBR) may also be considered for such high burst flows.

With respect to the NAS layer keep alive signaling, this may consume considerable radio resources. Therefore, in some examples the keep alive message may be triggered due to NAS layer indication. The keep alive timer (e.g., a threshold time period) may be reset whenever the PC5-RRC layer has successful signaling. In some examples, a DRB layer transmission with successful HARQ can also cancel keep alive messaging.

Accordingly, aspects of the described techniques introduce keep alive signaling in the PC5-S protocol. In the keep alive signaling management, this may take into account the AS layer indication (e.g., to reduce waste). The PC5-RRC layer may handle RLF trigger to the NAS layer based on different DRB (e.g., flow) considerations. Aspects of the described techniques may also introduce PC5-RRC layer signaling to reconfigure the DRBs due to the RLF management. The UE configuration for the RLF detection (e.g., the inactivity timer) may be based on the QoS information.

Figure 3:
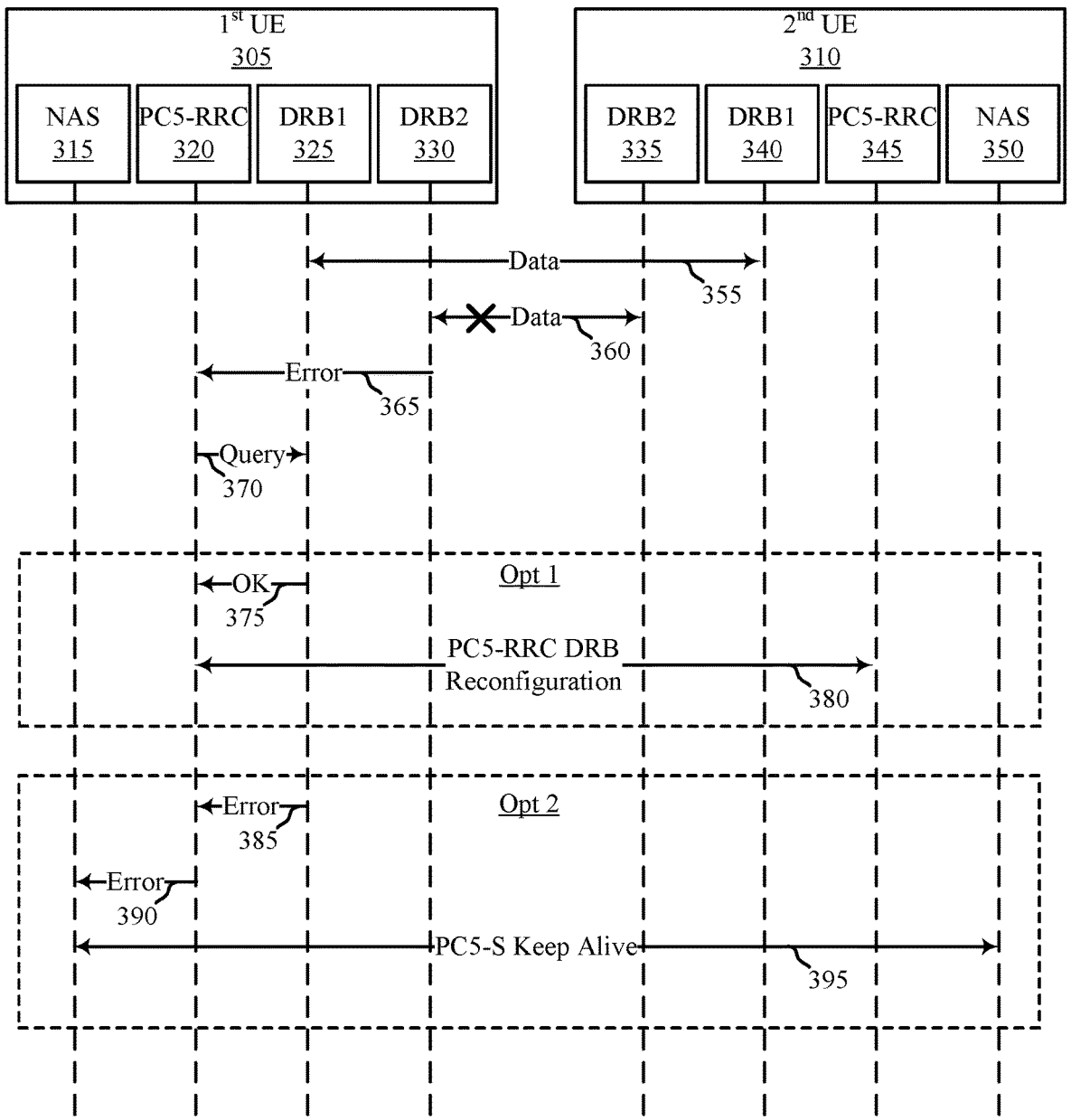
FIG. 3 illustrates an example of a process that supports unicast link RLF detection and management in accordance with aspects of the present disclosure.

FIG. 3 illustrates an example of a process 300 that supports unicast link RLF detection and management in accordance with aspects of the present disclosure. In some examples, process 300 may implement aspects of wireless communication systems 100 and/or 200. Aspects of process 300 may be implemented by a first UE 305 and a second UE 310, which may be examples of corresponding devices described herein. In some aspects, the first UE 305 and the second UE 310 may be performing wireless communications over a sidelink channel.

In some aspects, the first UE 305 may include a NAS layer 315 (e.g., a L3 or NAS protocol layer) and a PC5-RRC layer 320 (e.g., a L2 or AS protocol layer). Similarly, the second UE 310 may include a NAS layer 350 and a PC5-RRC layer 345. As discussed, the first UE 305 and the second UE 310 may have established a sidelink connection that includes a plurality of flows. Each flow may correspond to a different DRB and/or QoS requirement associated with data communications over the flow. Accordingly and in the example process 300, the first UE 305 may include a first DRB 325 and a second DRB 330. Similarly, the second UE 310 may include a first DRB 340 and a second DRB 335. Thus, the first DRB 325 of the first UE 305 and first DRB 340 of the second UE 310 may correspond to, or otherwise be associated with, a first flow used for data communications over the sidelink channel. The second DRB 330 of the first UE 305 and the second DRB 335 of the second UE 310 may correspond to, or otherwise be associated with, a second flow used for data communications over the sidelink channel. As discussed above, the first flow and second flow (as well as any other flows configured for the sidelink connection) may have separate configurations, e.g., QoS requirements.

Accordingly and at 355, the first UE 305 and second UE 310 may be performing wireless communications (e.g., communicating data) over the first flow (e.g., via the first DRB 325 of the first UE 305 and the first DRB 340 of the second UE 310) of the sidelink connection. The data communicated over the first flow may have an associated QoS requirement, e.g., a latency threshold, reliability threshold, throughput requirement, etc.

Similarly and at 360, the first UE 305 and the second UE 310 may be performing wireless communications over the second flow (e.g., via the second DRB 330 of the first UE 305 and the second DRB 335 of the second UE 310) of the sidelink connection. The data communicated over the second flow may have an associated QoS requirement that is the same as, or different than, the QoS requirement of the first flow.

Generally, the first UE 305 and the second UE 310 may monitor data communicated over each flow configured for the sidelink connection. Based on the monitoring, each UE may determine the radio link status for the sidelink connection. However, at 360 the first UE 305 may determine that no data is being successfully communicated across the second flow (as indicated by the X). It is to be understood that the lack of data successfully communicated over the second flow is provided by way of non-limiting example only and that the describe techniques may be implemented with respect to any flow configured for the sidelink connection.

For example, the first UE 305 may determine that there is no data being successfully communicated over the second flow based on an inactivity timer exceeding a threshold time/expiring, based on a lack of acknowledgment messages received for data communicated over the second flow, and the like. As discussed, the determination that no data is being successfully communicated (e.g., the RLF trigger) may be configured the same or differently for each flow. That is, the threshold for determining that no data is being successfully communicated over the second flow may be the same as or different from the threshold for the determination that no data is being successfully communicated over the first flow.

At 365 and for the first flow over DRB1, the first UE 305 may determine that it has no data successfully communicated for a threshold time (e.g., based on an inactivity timer having a configured value) and/or that it cannot send data over the first flow (e.g., based on HARQ feedback) and send an error indicator (e.g., RLF trigger) to the PC5-RRC layer 320 (e.g., the lack of data at 360 may trigger the error or RLF indication at 365). In some aspects, the error indication may be based on data communicated over the second flow failing to satisfy the QoS requirement associated with the second flow.

At 370 and in response to the error indication, the PC5-RRC layer 320 may query the other flows (including the first flow over DRB1) of the sidelink connection to determine whether they have experienced a loss of data communications. For example, the PC5-RRC layer 320 may check the inactivity timer associated with the other flows, determine whether data being communicated across the other flows is successful (e.g., based on HARQ feedback), determine whether data being communicated across the other flows satisfy the corresponding QoS requirements, and the like. Thus, the PC5-RRC layer 320 will query other active bearers (e.g., DRB1) having the same destination address (e.g., layer 2 ID having the same cast type). The next steps taken by the first UE 305 may depend on the response to the query at 370.

In a first option and at 375, the PC5-RRC layer 320 may determine that there is data being successfully communicated across the other flows (such as the first flow) of the sidelink channel. For example, the PC5-RRC layer 320 may determine that the inactivity timer associated with the other flows may not have reached a threshold/expired, that data is being communicated and acknowledged across the other flows, and the like. In some aspects, the response to the query may also include measurement info, e.g., CQI, RSRP, etc., for the associated flow.

In response to determining that data is being successfully communicated across the other flows, the PC5-RRC layer 320 may take several steps. One-step may include canceling the trigger received at 365. That is, the determination that data is being communicated across the other flows may indicate that the sidelink connection has not experienced an RLF and, therefore, avoid unnecessarily triggering an RLF recovery procedure and/or transmission of the NAS layer message. In another example and at 380, the first UE 305 may initiate PC5-RRC signaling to the second UE 310 to change to a different configuration. That is, the first UE 305 may transmit a message to the second UE 310 (at the NAS and/or AS layer) reconfiguring one or more parameters of the sidelink connection. This may include adjusting an MCS, a power level, range, etc., to improve compliance with the associated QoS requirements. This may include selecting a new configuration for the QoS configuration and/or a new configuration for the sidelink channel.

In some aspects, this may include triggering the NAS layer 315 to update the QoS flow configuration. In some aspects, the PC5-RRC layer 320 of the first UE 305 and the PC5-RRC layer 345 of the second UE 310 may have a set of QoS configurations configured for the flow, and select a new QoS configuration without informing the NAS layer 315 of the first UE 305 and/or NAS layer 350 of the second UE 310.

In a second option and at 385, the query with regards to the data being successfully communicated across the other flows may return an error indication. For example, the error indication may also be associated with an inactivity timers for the other flows reaching corresponding thresholds (e.g., expiring), failure to satisfy QoS requirements configured for each flow, a lack of HARQ feedback for data communicated across the flows, and the like.

In response and at 390, the PC5-RRC layer 320 may indicate an error (e.g., an RLF trigger) to the NAS layer 315. At 390, this may trigger the NAS layer 315 to initiate (e.g., transmit) keep alive signaling with the NAS layer 350 of the second UE 310. The keep alive signaling (e.g., a NAS layer message) transmitted at the NAS layer 315 may be sent over one or more of the flows and/or an SRB (e.g., to improve reliability and feedback from the second UE 310). In some aspects, the error indication may also carry or convey information identifying a cause for the error indication.

If the second UE 310 receives the keep alive signaling at 395 and responds, this may trigger the PC5-RRC layer 320 of the first UE 305 and the PC5-RRC layer 345 of the second UE 310 to exchange various messages to reconfigure parameters associated with the flows of the sidelink connection. For example, they may renegotiate the DRBs and/or the QoS flow configurations for any impacted flow of the sidelink connection.

However, if the NAS layer signaling returns an error (e.g., the first UE 305 does not receive a response to the keep alive signaling), the first UE 305 may declare an RLF and initiate an RLF recovery procedure, e.g., tear down the L2 link (e.g., the sidelink connection) and release all associated resources and report the error to its base station. Alternatively, the NAS layer 315 of the first UE 305 and the NAS layer 350 of the second UE 310 may choose to perform the RLF recovery by keeping (e.g., maintaining) the security associations and having another discovery for the same application layer ID.

Accordingly, process 300 illustrates various techniques that can be used at the AS layer (e.g., the PC5-RRC layers) and/or the NAS layers of the first UE 305 and the second UE 310 in the event that an RLF is detected on at least one flow (e.g., at least one DRB) of the sidelink connection. This may avoid the situation where an RLF is unnecessarily declared, which would utilize substantial over the air resources to establish a new sidelink connection.

Figure 4:
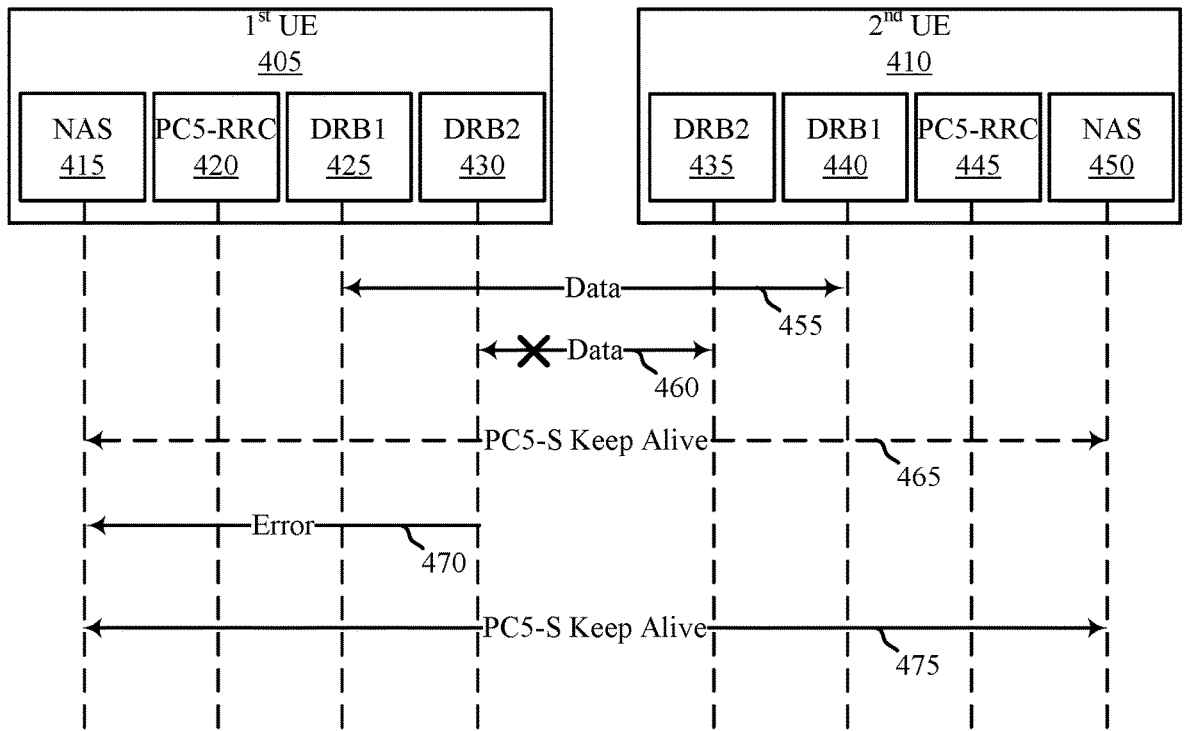
FIG. 4 illustrates an example of a process that supports unicast link RLF detection and management in accordance with aspects of the present disclosure.

FIG. 4 illustrates an example of a process 400 that supports unicast link RLF detection and management in accordance with aspects of the present disclosure. In some examples, process 400 may implement aspects of wireless communication systems 100 and/or 200 and/or process 300. Aspects of process 400 may be implemented by a first UE 405 and a second UE 410, which may be examples of corresponding devices described herein. In some aspects, the first UE 405 and the second UE 410 may be performing wireless communications over a sidelink channel.

In some aspects, the first UE 405 may include a NAS layer 415 (e.g., a L3 or NAS protocol layer) and a PC5-RRC layer 420 (e.g., a L2 or AS protocol layer). Similarly, the second UE 410 may include a NAS layer 450 and a PC5-RRC layer 445. As discussed, the first UE 405 and the second UE 410 may have established a sidelink connection that includes a plurality of flows. Each flow may correspond to a different DRB and/or QoS requirement associated with data communications. Accordingly and in the example process 400, the first UE 405 may include a first DRB 425 and a second DRB 430. Similarly, the second UE 410 may include a first DRB 440 and a second DRB 435. Thus, the first DRB 425 of the first UE 405 and first DRB 440 of the second UE 410 may correspond to, or otherwise be associated with, a first flow used for data communications over the sidelink channel. The second DRB 430 of the first UE 405 and the second DRB 435 of the second UE 410 may correspond to, or otherwise be associated with, a second flow used for data communications over the sidelink channel. As discussed above, the first flow and second flow (as well as any other flows configured for the sidelink connection) may have separate configurations, e.g., QoS requirements.

Accordingly, at 455, the first UE 405 and second UE 410 may be performing wireless communications (e.g., communicating data) over the first flow (e.g., via the first DRB 425 of the first UE 405 and the first DRB 440 of the second UE 410) of the sidelink connection. The data communicated over the first flow may have an associated QoS requirement, e.g., a latency threshold, reliability threshold, throughput requirement, etc.

Similarly, at 460, the first UE 405 and the second UE 410 may be performing wireless communications over the second flow (e.g., via the second DRB 430 of the first UE 405 and the second DRB 435 of the second UE 410) of the sidelink connection. The data communicated over the second flow may have an associated QoS requirement that is the same as or different than the QoS requirement of the first flow.

Generally, the first UE 405 and the second UE 410 may monitor data communicated over each flow configured for the sidelink connection. Based on the monitoring, each UE may determine the radio link status for the sidelink connection. However, at 460 the first UE 405 may determine that no data is being successfully communicated across the second flow (as indicated by the X). It is to be understood that the lack of data successfully communicated over the second flow is provided by way of non-limiting example only and that the describe techniques may be implemented with respect to any flow configured for the sidelink connection.

For example, the first UE 405 may determine that there is no data being successfully communicated over the second flow based on an inactivity timer exceeding a threshold time/expiring, based on a lack of acknowledgment messages received for data communicated over the first flow, based on data communicated over the first flow failing to satisfy the associated QoS requirements, and the like. As discussed, the determination that no data is being successfully communicated (e.g., the RLF trigger) may be configured the same or differently for each flow. That is, the threshold for determining that no data is being successfully communicated over the first flow may be the same as or different from the threshold for the determination that no data is being successfully communicated over the second flow.

At 465, the NAS layer 415 of the first UE 405 and the NAS layer 450 of the second UE 410 may optionally exchange a NAS layer message (e.g., a keep alive message). For example, the keep alive message may have been exchanged due to the first UE 405 and/or the second UE 410 previously detecting a loss of data communications over one of the flows of the sidelink connection, according to a periodic schedule, and the like.

At 470 and for the first flow over DRB1, the first UE 405 may determine that it has no data for a threshold time (e.g., based on an inactivity timer having a configured value expiring) and/or that it cannot send data over the first flow (e.g., based on HARQ feedback) and send an error indication (e.g., RLF trigger) to the NAS layer 415 (e.g., the lack of data at 460 may trigger the RLF indication at 470). In some aspects, the error indication may be based on data communicated over the second flow failing to satisfy the QoS requirement associated with that flow, based on a lack of acknowledgment messaging received for data communicated over the flow, based on the inactivity timer expiring or reaching a threshold time, and the like.

That is, in some aspects the NAS layer 415 (e.g., PC5-S, V2X layer) may handle the error from the AS layer based on the keep alive messaging status. When data communicated over the first flow experiences interruption, this triggers the error indication to the NAS layer 415. In some aspects, the error indication may carry or convey information differentiating the cause for the trigger, e.g., due to inactivity timer expiration, due to consecutive transmission errors (e.g., based on HARQ feedback and/or RLC error count reaching a threshold), and the like.

Based on the error indication and the triggering cause code, the NAS layer 415 may determine the appropriate action to take. As one example and for the situation where the inactivity timer expires, the NAS layer 415 may wait for the next keep alive period to send the next keep alive message (e.g., in the situation where keep alive signaling is periodically exchanged between the NAS layer 415 of the first UE 405 and the NAS layer 450 of the second UE 410). For example, the NAS layer 415 may determine that keep alive signaling was exchanged at 465 and/or that another scheduled keep alive message is approaching, and therefore wait until the next scheduled keep alive message.

As another example and for the situation where the trigger is due to transmission errors, the NAS layer 415 may trigger the keep alive signaling immediately. Accordingly and at 475, the NAS layer 415 of the first UE 405 may transmit a keep alive message to the NAS layer 450 of the second UE 410. In some aspects of this example, the NAS layer 415 may also determine whether previous NAS layer message (e.g., the keep alive signaling) was transmitted within a threshold time period and, if so, may provide feedback to the second flow to wait until the next keep alive signaling is scheduled.

If the second UE 410 receives the keep alive signaling at 475 and responds, this may trigger PC5-RRC layer 420 of the first UE 405 and PC5-RRC layer 445 of the second UE 410 to exchange various messages to reconfigure parameters associated with the flows of the sidelink connection. For example, they may renegotiate the DRBs and/or the QoS flow configurations for any impacted flow of the sidelink connection.

However, if the NAS layer signaling returns an error (e.g., the first UE 405 does not receive a response to the keep alive signaling), the first UE 405 may declare an RLF and initiate an RLF recovery procedure, e.g., to tear down the L2 link (e.g., the sidelink connection) and release all associated resources and report the error to its base station. Alternatively, the NAS layer 415 of the first UE 405 and the NAS layer 450 of the second UE 410 may choose to perform the RLF recovery by keeping (e.g., maintaining) the security associations and having another discovery for the same application layer ID.

Accordingly, process 400 illustrates various techniques that can be used at the AS layer (e.g., the PC5-RRC layers) and/or the NAS layer of the first UE 405 and the second UE 410 in the event that an RLF is detected on at least one flow (e.g., at least one DRB) of the sidelink connection. This may avoid the situation where an RLF is unnecessarily declared, which would utilize substantial over the air resources to establish a new sidelink connection.

Figure 5:
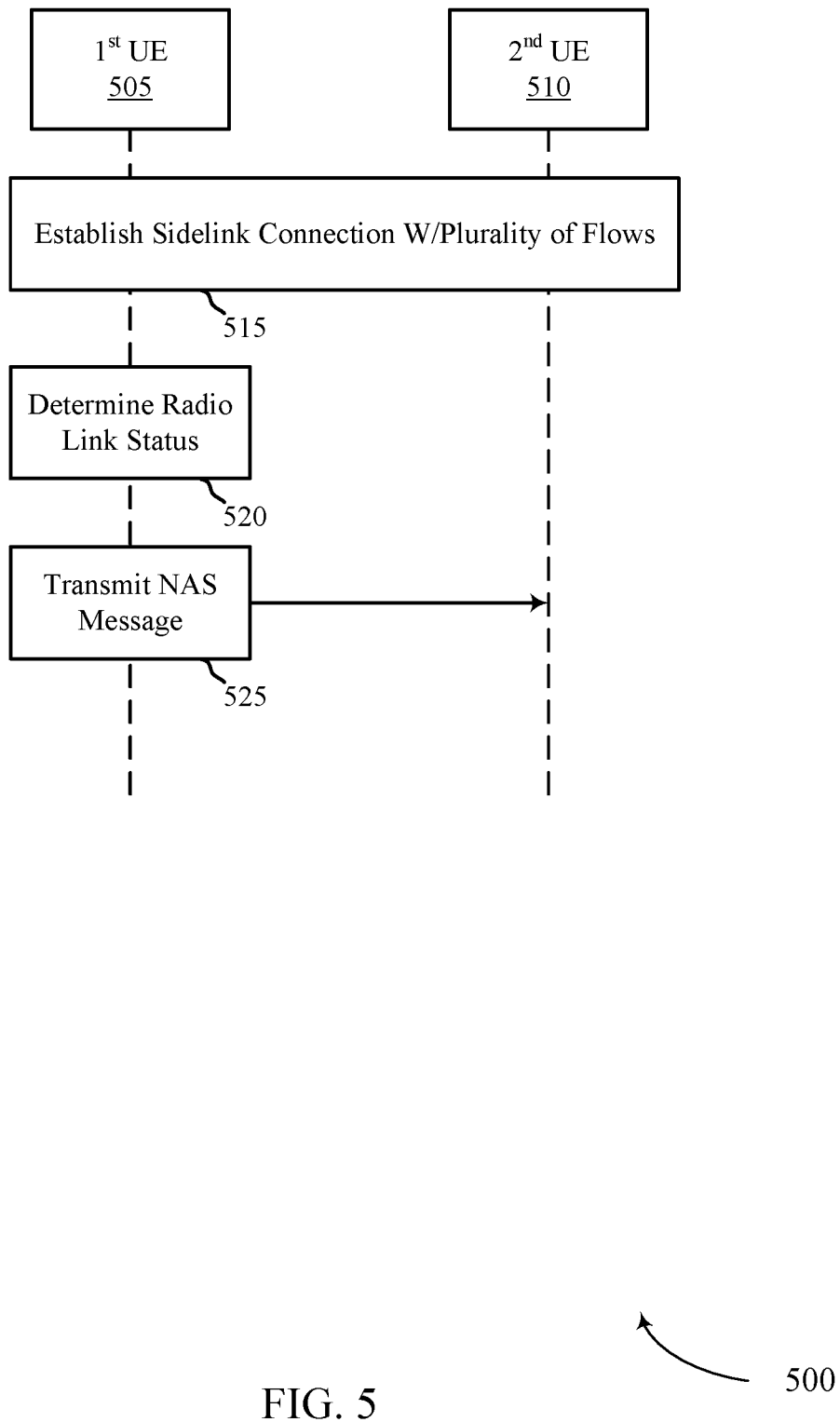
FIG. 5 illustrates an example of a process that supports unicast link RLF detection and management in accordance with aspects of the present disclosure.

FIG. 5 illustrates an example of a process 500 that supports unicast link RLF detection and management in accordance with aspects of the present disclosure. In some examples, process 500 may implement aspects of wireless communication systems 100 and/or 200 and/or processes 300 and/or 400. Aspects of process 500 may be implemented by a first UE 505 and/or a second UE 510, which may be examples of corresponding devices described herein. In some aspects, the first UE 505 and the second UE 510 may be performing wireless communications over a sidelink connection.

At 515, the first UE 505 and the second UE 510 may establish a sidelink connection. The sidelink connection may be established over a PC5 interface and may include multiple flows. Generally, each flow may correspond to a stream of data being communicated over the sidelink connection via a particular DRB, according to a specific QoS requirement, and the like.

At 520, the first UE 505 may determine the radio link status of the sidelink connection. For example, the first UE 505 may monitor data communicated over each flow of the sidelink connection to determine the radio link status. Although not shown, it is to be understood that the second UE 510 may also monitor communications over the flows of the sidelink connection to determine the radio link status from its perspective.

At 525, the first UE 505 may transmit (and the second UE 510 may receive) a NAS layer message based on the radio link status of the sidelink connection. In some aspects, the NAS layer message may include keep alive signaling to determine whether the sidelink connection is active. In some aspects, the NAS layer message (and/or AS layer messaging) may include information reconfiguring various QoS parameters of the flows.

In some aspects, this may include the first UE 505 determining that no data is being successfully communicated across a first flow (and/or any other flow(s)) of the plurality of flows of the sidelink connection. Accordingly, the first UE 505 may transmit the NAS layer message to the second UE 510, with the message including keep alive signaling requesting confirmation from the second UE 510 that the radio link status of the sidelink connection is active. If the second UE 510 transmits a response message (and the first UE 505 receives the response) indicating that the radio link status of the sidelink connection is active, the first UE 505 may transmit (and the second UE 510 may receive) a second message (e.g., at the NAS layer and/or at the AS layer) reconfiguring one or more parameters of the sidelink connection. For example, they may reconfigure the sidelink connection from a first configuration to a second configuration from a set of available configurations (e.g., from a set of available configurations). As another example they may reconfigure one or more QoS parameters configured for the sidelink connection. In some aspects, the first UE 505 may determine that it did not receive a response message from the second UE 510. Based on the lack of response, the first UE 505 may determine that the radio link status of the sidelink connection is RLF. Accordingly, the first UE 505 may perform an RLF recovery procedure to establish a second sidelink connection with the second UE 510.

In some aspects, the first UE 505 may determine that data being communicated across the first flow fails to satisfy the corresponding QoS requirement associated with the first flow. In some aspects, this may include the first UE 505 determining that no data has been successfully communicated across the first flow for a threshold time period associated with the first flow (e.g., based on an inactivity timer).

In some aspects, this may include the first UE 505 determining that no data is successfully communicated across a first flow, but that data is being successfully communicated across a second flow of the sidelink connection (and/or any other flow of the sidelink connection). Accordingly, the first UE 505 may determine that the radio link status of the sidelink connection is a degraded radio link status. Therefore, the first UE 505 may transmit (and the second UE 510 may receive) a second message (e.g., at the NAS layer and/or AS layer) reconfiguring one or more parameters of the sidelink connection, e.g., selecting a new configuration for the sidelink connection, reconfiguring QoS parameters, and the like.

In some aspects, the first UE 505 may determine that the NAS layer message was transmitted within a threshold time period and, therefore, refrain from transmitting a second NAS layer message. In some aspects, the NAS layer message may include a PC5-S message.

Figure 6:
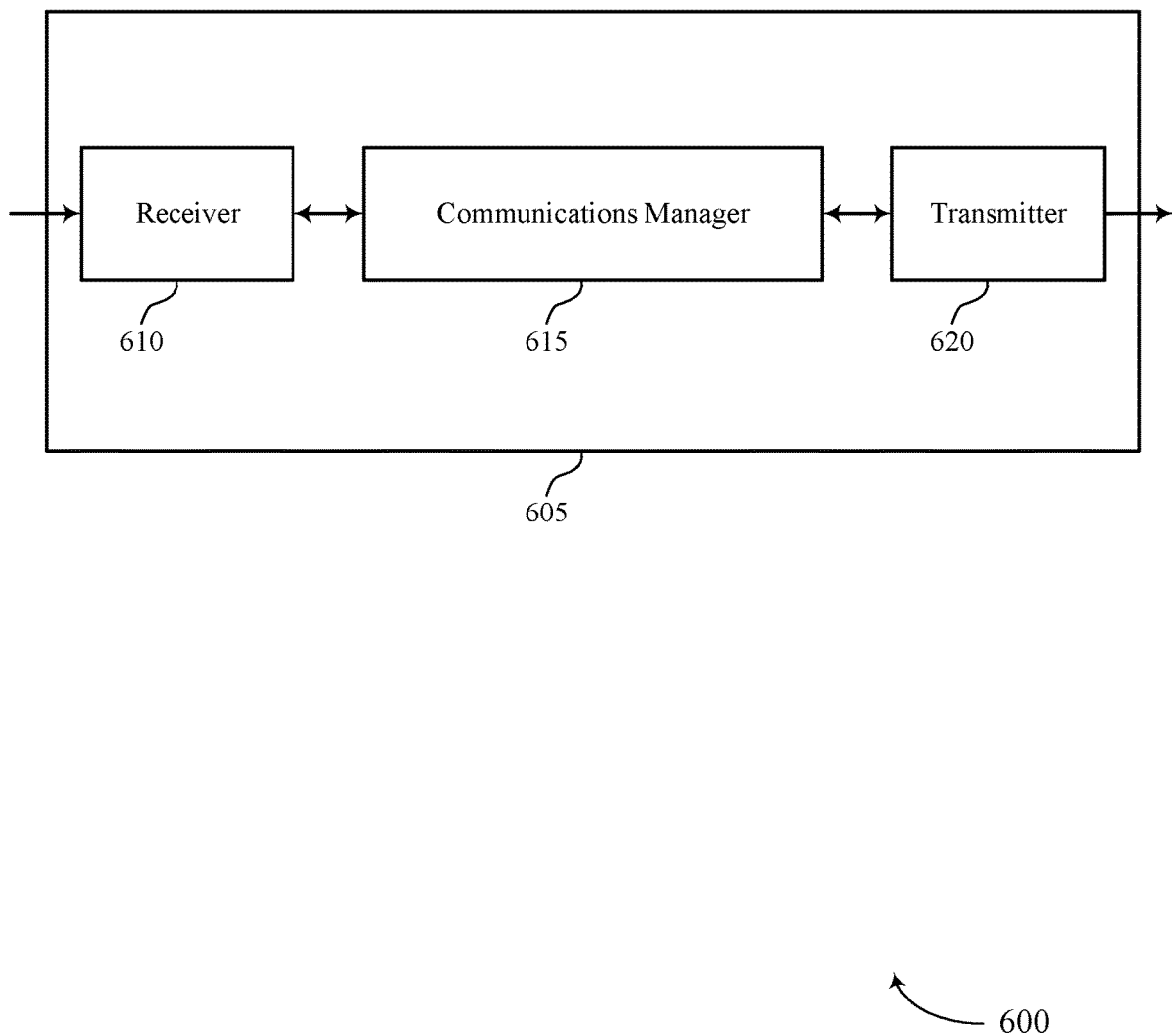
FIGS. 6 and 7 show block diagrams of devices that support unicast link RLF detection and management in accordance with aspects of the present disclosure.

FIG. 6 shows a block diagram 600 of a device 605 that supports unicast link RLF detection and management in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to unicast link RLF detection and management, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a sidelink connection with a second UE, where the sidelink connection is associated with a set of flows, determine, based on monitoring each flow of the set of flows, a radio link status of the sidelink connection, and transmit, based on the determining, a non-access stratum layer message to the second UE based at least on the radio link status of the sidelink connection.

The communications manager 615 may also establish a sidelink connection with a first UE, where the sidelink connection is associated with a set of flows, receive a non-access stratum layer message from the first UE indicating a radio link status of the sidelink connection, where the non-access stratum layer message is based on a status at the first UE of each flow of the set of flows, and transmit a response message to the first UE indicating that the radio link status of the sidelink connection with the first UE is active. The communications manager 615 may be an example of aspects of the communications manager 910 described herein.

The actions performed by the communications manager 615 as described herein may be implemented to realize one or more potential advantages. One implementation may allow a UE 115 to save power and increase battery life by determining the radio link status of the sidelink connection. Another implementation may provide improved quality and reliability of service at the UE 115, as sidelink connections may be enhanced.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
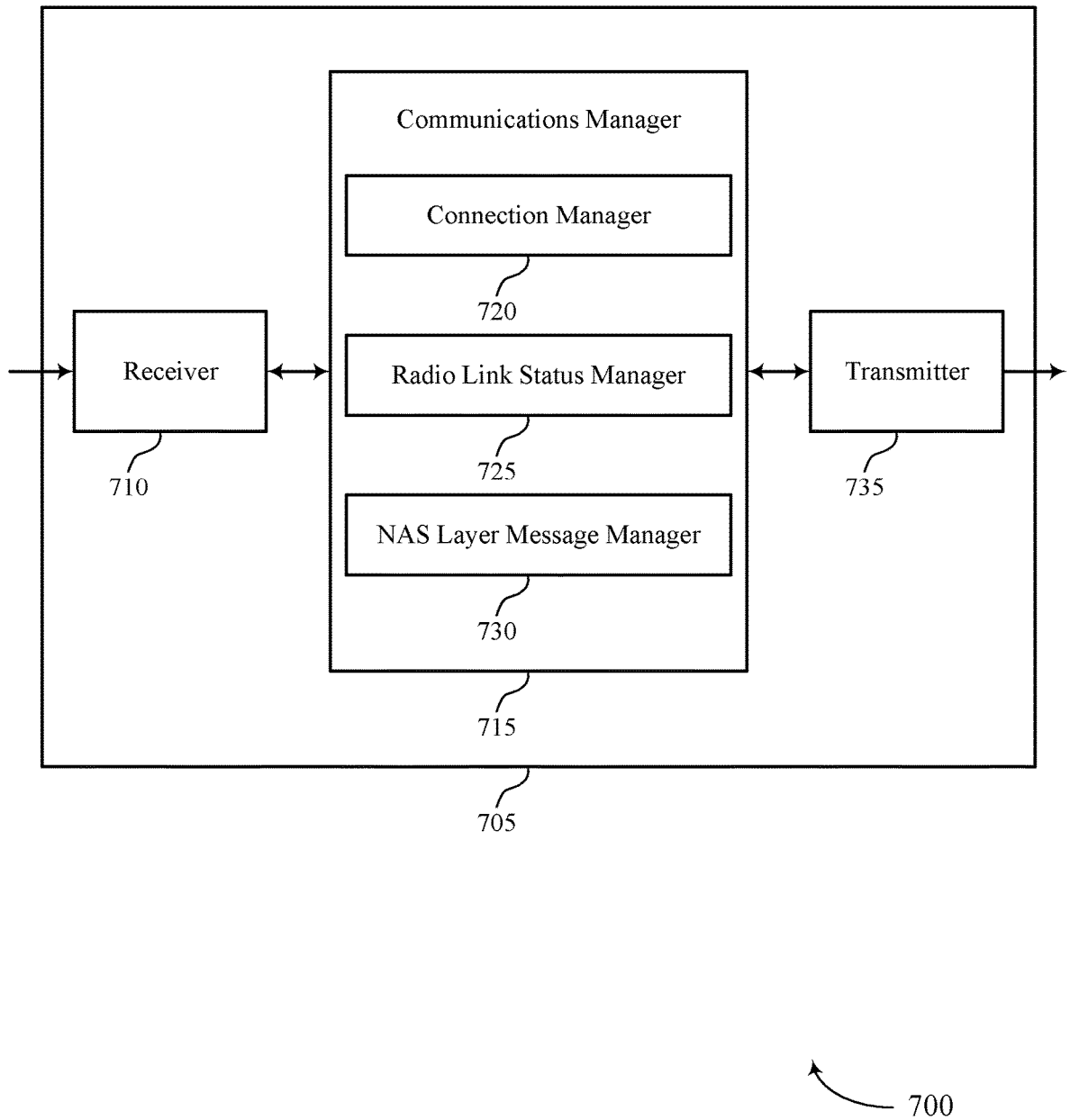

FIG. 7 shows a block diagram 700 of a device 705 that supports unicast link RLF detection and management in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to unicast link RLF detection and management, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection manager 720, a radio link status manager 725, and a NAS layer message manager 730. The communications manager 715 may be an example of aspects of the communications manager 910 described herein.

The connection manager 720 may establish a sidelink connection with a second UE, where the sidelink connection is associated with a set of flows.

The radio link status manager 725 may determine, based on monitoring each flow of the set of flows, a radio link status of the sidelink connection.

The NAS layer message manager 730 may transmit, based on the determining, a non-access stratum layer message to the second UE based at least on the radio link status of the sidelink connection.

The connection manager 720 may establish a sidelink connection with a first UE, where the sidelink connection is associated with a set of flows.

The NAS layer message manager 730 may receive a non-access stratum layer message from the first UE indicating a radio link status of the sidelink connection, where the non-access stratum layer message is based on a status at the first UE of each flow of the set of flows and transmit a response message to the first UE indicating that the radio link status of the sidelink connection with the first UE is active.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
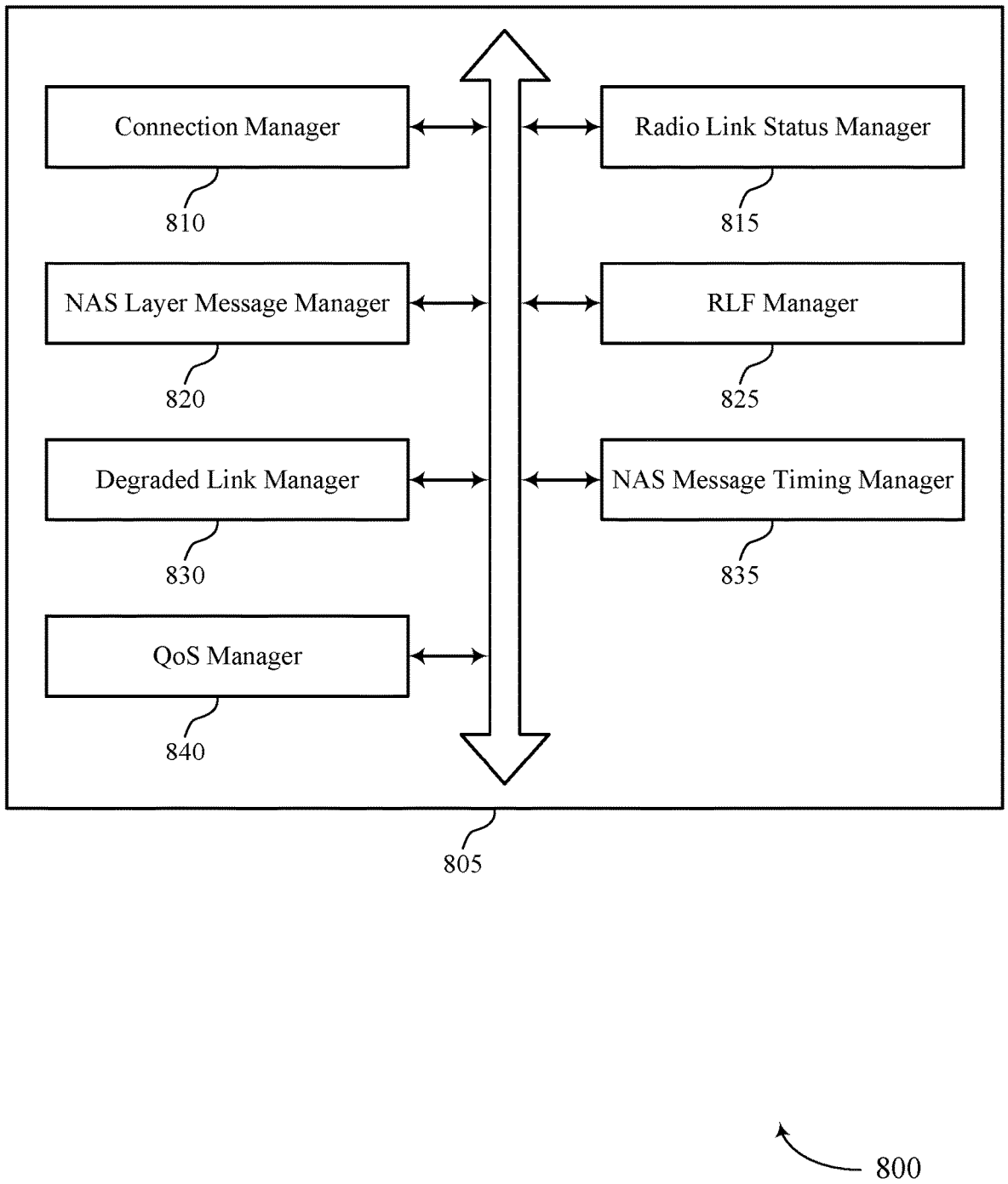
FIG. 8 shows a block diagram of a communications manager that supports unicast link RLF detection and management in accordance with aspects of the present disclosure.

FIG. 8 shows a block diagram 800 of a communications manager 805 that supports unicast link RLF detection and management in accordance with aspects of the present disclosure. The communications manager 805 may be an example of aspects of a communications manager 615, a communications manager 715, or a communications manager 910 described herein. The communications manager 805 may include a connection manager 810, a radio link status manager 815, a NAS layer message manager 820, a RLF manager 825, a degraded link manager 830, a NAS message timing manager 835, and a QoS manager 840. Each of these modules may communicate, directly or indirectly, with one another (e.g., via one or more buses).

The connection manager 810 may establish a sidelink connection with a second UE, where the sidelink connection is associated with a set of flows. In some examples, the connection manager 810 may establish a sidelink connection with a first UE, where the sidelink connection is associated with a set of flows.

The radio link status manager 815 may determine, based on monitoring each flow of the set of flows, a radio link status of the sidelink connection.

The NAS layer message manager 820 may transmit, based on the determining, a non-access stratum layer message to the second UE based at least on the radio link status of the sidelink connection. In some examples, the NAS layer message manager 820 may receive a non-access stratum layer message from the first UE indicating a radio link status of the sidelink connection, where the non-access stratum layer message is based on a status at the first UE of each flow of the set of flows. In some examples, the NAS layer message manager 820 may transmit a response message to the first UE indicating that the radio link status of the sidelink connection with the first UE is active. In some cases, the non-access stratum layer message includes a PC5-S message. In some cases, the non-access stratum layer message includes a keep-alive message requesting confirmation from the second UE that the radio link status of the sidelink connection is active.

The RLF manager 825 may determine that no data is communicated across a first flow of the set of flows. In some examples, transmitting the non-access stratum layer message to the second UE, where the non-access stratum layer message includes a keep-alive message requesting confirmation from the second UE that the radio link status of the sidelink connection is active. In some examples, the RLF manager 825 may receive a response message from the second UE indicating that the radio link status of the sidelink connection with the second UE is active. In some examples, the RLF manager 825 may transmit, based on the response message, a second message to the second UE reconfiguring one or more parameters of the sidelink connection. In some examples, the RLF manager 825 may reconfigure the sidelink connection from a first configuration to a second configuration from a set of available configurations configured for the sidelink connection. In some examples, the RLF manager 825 may reconfigure one or more quality of service parameters configured for the sidelink connection. In some examples, determining, based on a lack of a response message from the second UE, that the radio link status of the sidelink connection with the second UE includes a radio link failure.

In some examples, the RLF manager 825 may perform, based on the radio link failure, a radio link failure recovery procedure to establish a second sidelink connection with the second UE. In some examples, the RLF manager 825 may determine that data communicated across the first flow fails to satisfy a quality of service requirement associated with the first flow. In some examples, the RLF manager 825 may determine that no data has been communicated across the first flow for a threshold time period associated with the first flow.

The degraded link manager 830 may determine that no data is communicated across a first flow of the set of flows. In some examples, the degraded link manager 830 may determine that data is communicated across a second flow of the set of flows. In some examples, determining that the radio link status of the sidelink connection includes a degraded radio link status.

In some examples, the degraded link manager 830 may transmit a second message to the second UE reconfiguring one or more parameters of the sidelink connection. In some examples, the degraded link manager 830 may reconfigure the sidelink connection from a first configuration to a second configuration from a set of available configurations configured for the sidelink connection. In some examples, the degraded link manager 830 may reconfigure one or more quality of service parameters configured for the sidelink connection. In some examples, the degraded link manager 830 may receive, based on the response message, a second message from the first UE reconfiguring one or more parameters of the sidelink connection. In some examples, the degraded link manager 830 may reconfigure the one or more parameters of the sidelink connection based at least on part on the second message.

In some examples, the degraded link manager 830 may reconfigure the sidelink connection from a first configuration to a second configuration from a set of available configurations configured for the sidelink connection. In some examples, the degraded link manager 830 may reconfigure one or more quality of service parameters configured for the sidelink connection.

The NAS message timing manager 835 may determine that the non-access stratum layer message was transmitted within a threshold time period. In some examples, the NAS message timing manager 835 may refrain from transmitting a second non-access stratum layer message to the second UE based at least on the non-access stratum layer message.

The QoS manager 840 may determine, for each flow of the set of flows, whether data communicated across each flow satisfies a quality of service requirement configured for the flow.

Figure 9:
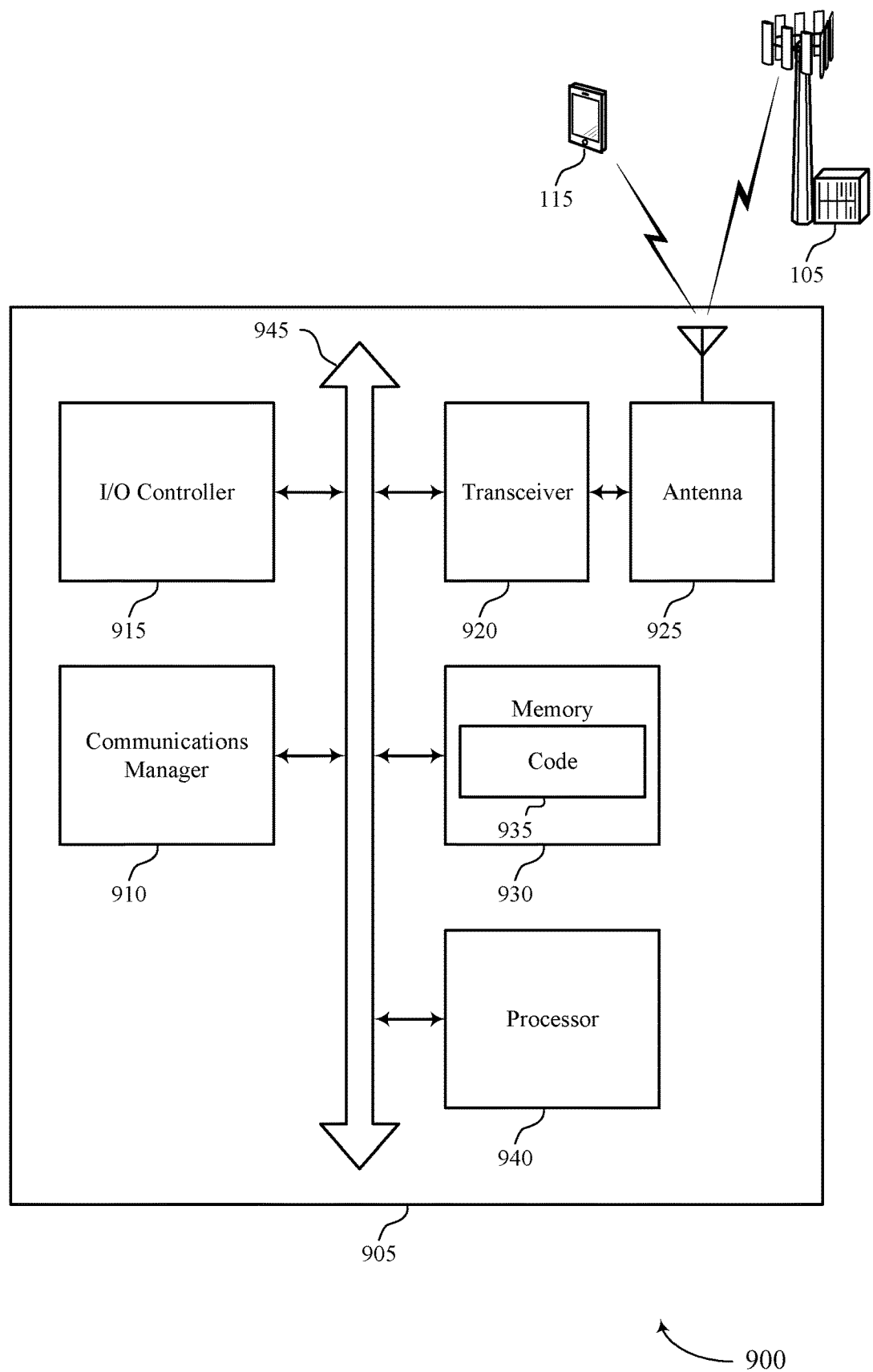
FIG. 9 shows a diagram of a system including a device that supports unicast link RLF detection and management in accordance with aspects of the present disclosure.

FIG. 9 shows a diagram of a system 900 including a device 905 that supports unicast link RLF detection and management in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a sidelink connection with a second UE, where the sidelink connection is associated with a set of flows, determine, based on monitoring each flow of the set of flows, a radio link status of the sidelink connection, and transmit, based on the determining, a non-access stratum layer message to the second UE based at least on the radio link status of the sidelink connection.

The communications manager 910 may also establish a sidelink connection with a first UE, where the sidelink connection is associated with a set of flows, receive a non-access stratum layer message from the first UE indicating a radio link status of the sidelink connection, where the non-access stratum layer message is based on a status at the first UE of each flow of the set of flows, and transmit a response message to the first UE indicating that the radio link status of the sidelink connection with the first UE is active.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting unicast link RLF detection and management).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The actions performed by the processor 940, memory 930, I/O controller 915, communications manager 910, transceiver 920, and antenna 925 as described herein may be implemented to realize one or more potential advantages. One implementation may allow the device 905 to save power and increase battery life by reconfiguring the sidelink connection from the first configuration to the second configuration from the set of available configurations configured for the sidelink connection. Another implementation may provide improved reliability and user experience at the device 905 through the reduction of signaling overhead.

Figure 10:
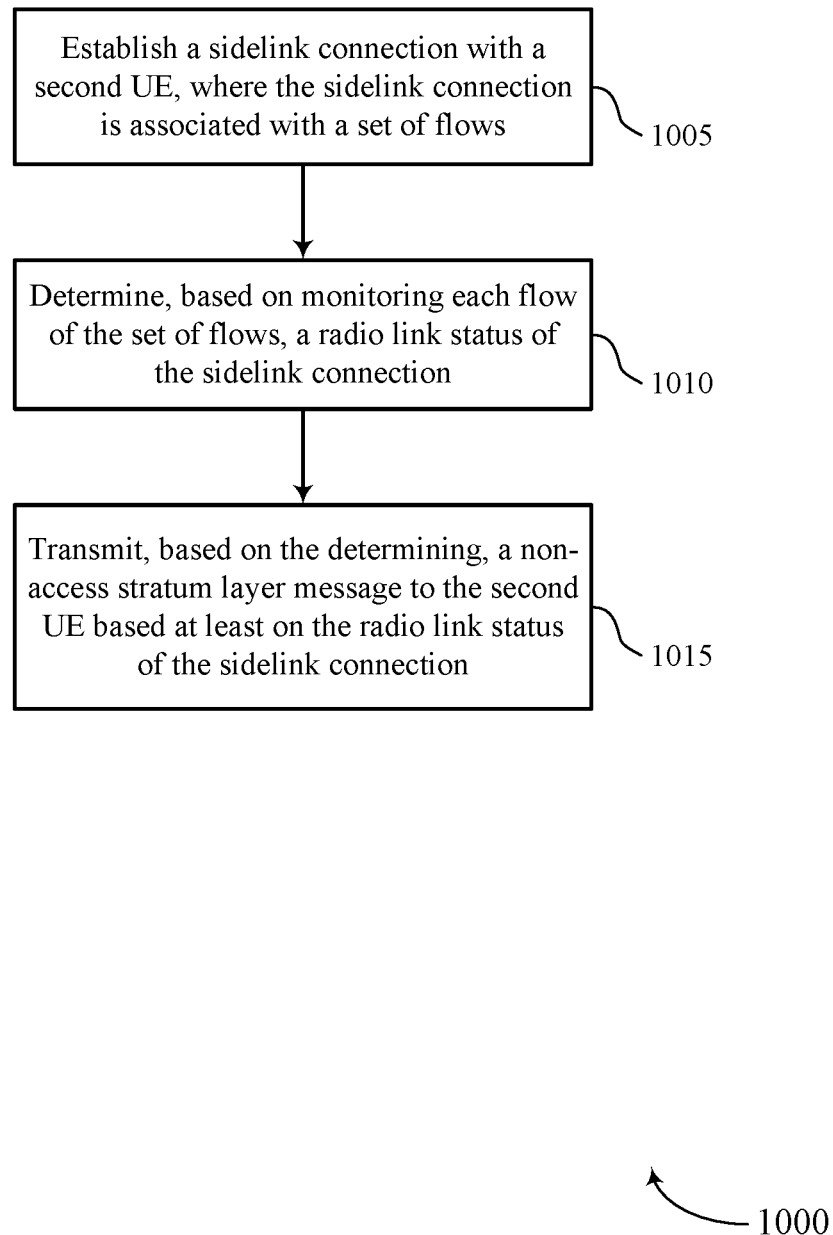
FIGS. 10 through 14 show flowcharts illustrating methods that support unicast link RLF detection and management in accordance with aspects of the present disclosure.

FIG. 10 shows a flowchart illustrating a method 1000 that supports unicast link RLF detection and management in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may establish a sidelink connection with a second UE, where the sidelink connection is associated with a set of flows. The operations of 1005 may be performed according to the methods described herein. In some examples, aspects of the operations of 1005 may be performed by a connection manager as described with reference to FIGS. 6 through 9.

At 1010, the UE may determine, based on monitoring each flow of the set of flows, a radio link status of the sidelink connection. The operations of 1010 may be performed according to the methods described herein. In some examples, aspects of the operations of 1010 may be performed by a radio link status manager as described with reference to FIGS. 6 through 9.

At 1015, the UE may transmit, based on the determining, a non-access stratum layer message to the second UE based at least on the radio link status of the sidelink connection. The operations of 1015 may be performed according to the methods described herein. In some examples, aspects of the operations of 1015 may be performed by a NAS layer message manager as described with reference to FIGS. 6 through 9.

Figure 11:
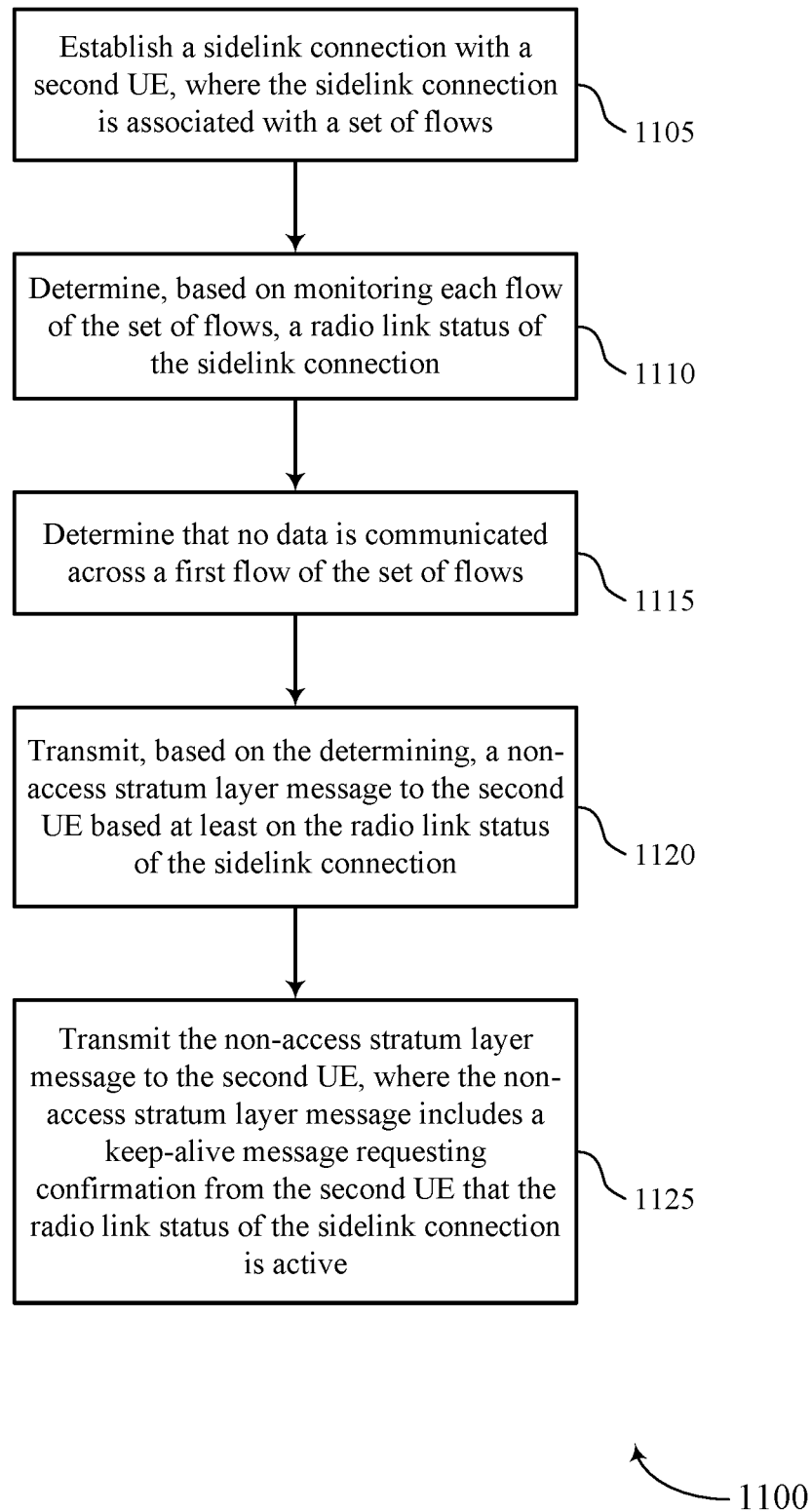

FIG. 11 shows a flowchart illustrating a method 1100 that supports unicast link RLF detection and management in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may establish a sidelink connection with a second UE, where the sidelink connection is associated with a set of flows. The operations of 1105 may be performed according to the methods described herein. In some examples, aspects of the operations of 1105 may be performed by a connection manager as described with reference to FIGS. 6 through 9.

At 1110, the UE may determine, based on monitoring each flow of the set of flows, a radio link status of the sidelink connection. The operations of 1110 may be performed according to the methods described herein. In some examples, aspects of the operations of 1110 may be performed by a radio link status manager as described with reference to FIGS. 6 through 9.

At 1115, the UE may determine that no data is communicated across a first flow of the set of flows. The operations of 1115 may be performed according to the methods described herein. In some examples, aspects of the operations of 1115 may be performed by a RLF manager as described with reference to FIGS. 6 through 9.

At 1120, the UE may transmit, based on the determining, a non-access stratum layer message to the second UE based at least on the radio link status of the sidelink connection. The operations of 1120 may be performed according to the methods described herein. In some examples, aspects of the operations of 1120 may be performed by a NAS layer message manager as described with reference to FIGS. 6 through 9.

At 1125, the UE may transmit the non-access stratum layer message to the second UE, where the non-access stratum layer message includes a keep-alive message requesting confirmation from the second UE that the radio link status of the sidelink connection is active. The operations of 1125 may be performed according to the methods described herein. In some examples, aspects of the operations of 1125 may be performed by a RLF manager as described with reference to FIGS. 6 through 9.

Figure 12:
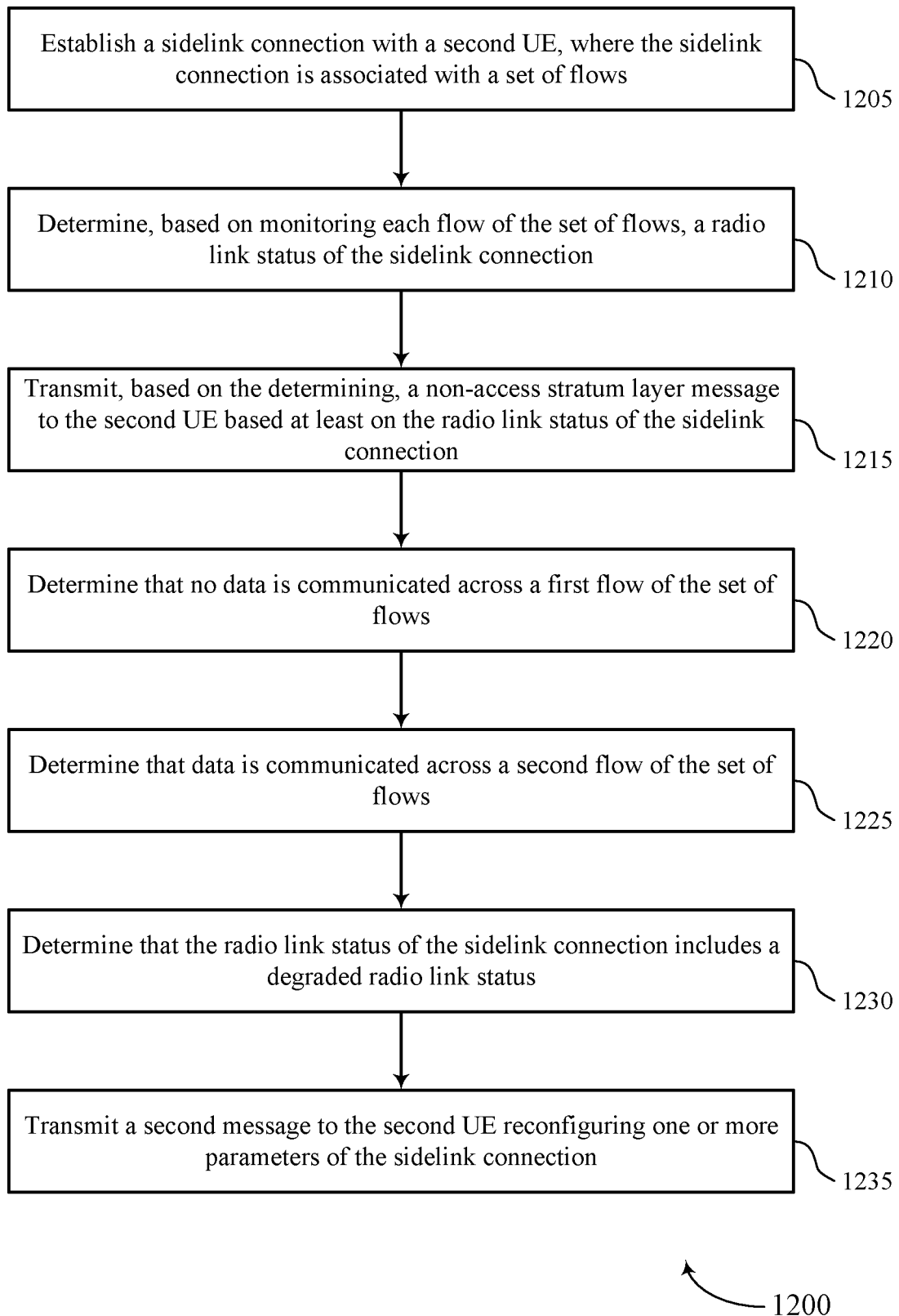

FIG. 12 shows a flowchart illustrating a method 1200 that supports unicast link RLF detection and management in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may establish a sidelink connection with a second UE, where the sidelink connection is associated with a set of flows. The operations of 1205 may be performed according to the methods described herein. In some examples, aspects of the operations of 1205 may be performed by a connection manager as described with reference to FIGS. 6 through 9.

At 1210, the UE may determine, based on monitoring each flow of the set of flows, a radio link status of the sidelink connection. The operations of 1210 may be performed according to the methods described herein. In some examples, aspects of the operations of 1210 may be performed by a radio link status manager as described with reference to FIGS. 6 through 9.

At 1215, the UE may transmit, based on the determining, a non-access stratum layer message to the second UE based at least on the radio link status of the sidelink connection. The operations of 1215 may be performed according to the methods described herein. In some examples, aspects of the operations of 1215 may be performed by a NAS layer message manager as described with reference to FIGS. 6 through 9.

At 1220, the UE may determine that no data is communicated across a first flow of the set of flows. The operations of 1220 may be performed according to the methods described herein. In some examples, aspects of the operations of 1220 may be performed by a degraded link manager as described with reference to FIGS. 6 through 9.

At 1225, the UE may determine that data is communicated across a second flow of the set of flows. The operations of 1225 may be performed according to the methods described herein. In some examples, aspects of the operations of 1225 may be performed by a degraded link manager as described with reference to FIGS. 6 through 9.

At 1230, the UE may determine that the radio link status of the sidelink connection includes a degraded radio link status. The operations of 1230 may be performed according to the methods described herein. In some examples, aspects of the operations of 1230 may be performed by a degraded link manager as described with reference to FIGS. 6 through 9.

At 1235, the UE may transmit a second message to the second UE reconfiguring one or more parameters of the sidelink connection. The operations of 1235 may be performed according to the methods described herein. In some examples, aspects of the operations of 1235 may be performed by a degraded link manager as described with reference to FIGS. 6 through 9.

Figure 13:
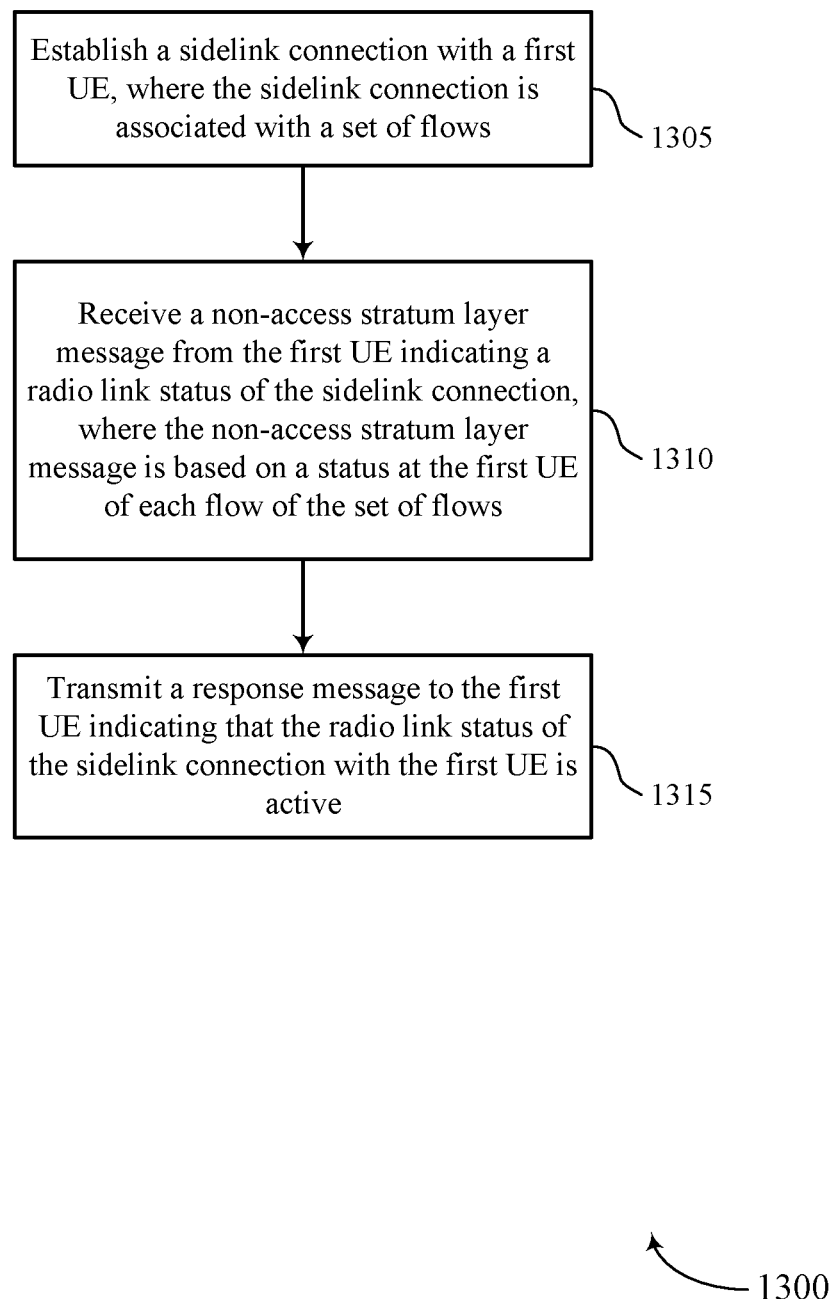

FIG. 13 shows a flowchart illustrating a method 1300 that supports unicast link RLF detection and management in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may establish a sidelink connection with a first UE, where the sidelink connection is associated with a set of flows. The operations of 1305 may be performed according to the methods described herein. In some examples, aspects of the operations of 1305 may be performed by a connection manager as described with reference to FIGS. 6 through 9.

At 1310, the UE may receive a non-access stratum layer message from the first UE indicating a radio link status of the sidelink connection, where the non-access stratum layer message is based on a status at the first UE of each flow of the set of flows. The operations of 1310 may be performed according to the methods described herein. In some examples, aspects of the operations of 1310 may be performed by a NAS layer message manager as described with reference to FIGS. 6 through 9.

At 1315, the UE may transmit a response message to the first UE indicating that the radio link status of the sidelink connection with the first UE is active. The operations of 1315 may be performed according to the methods described herein. In some examples, aspects of the operations of 1315 may be performed by a NAS layer message manager as described with reference to FIGS. 6 through 9.

Figure 14:
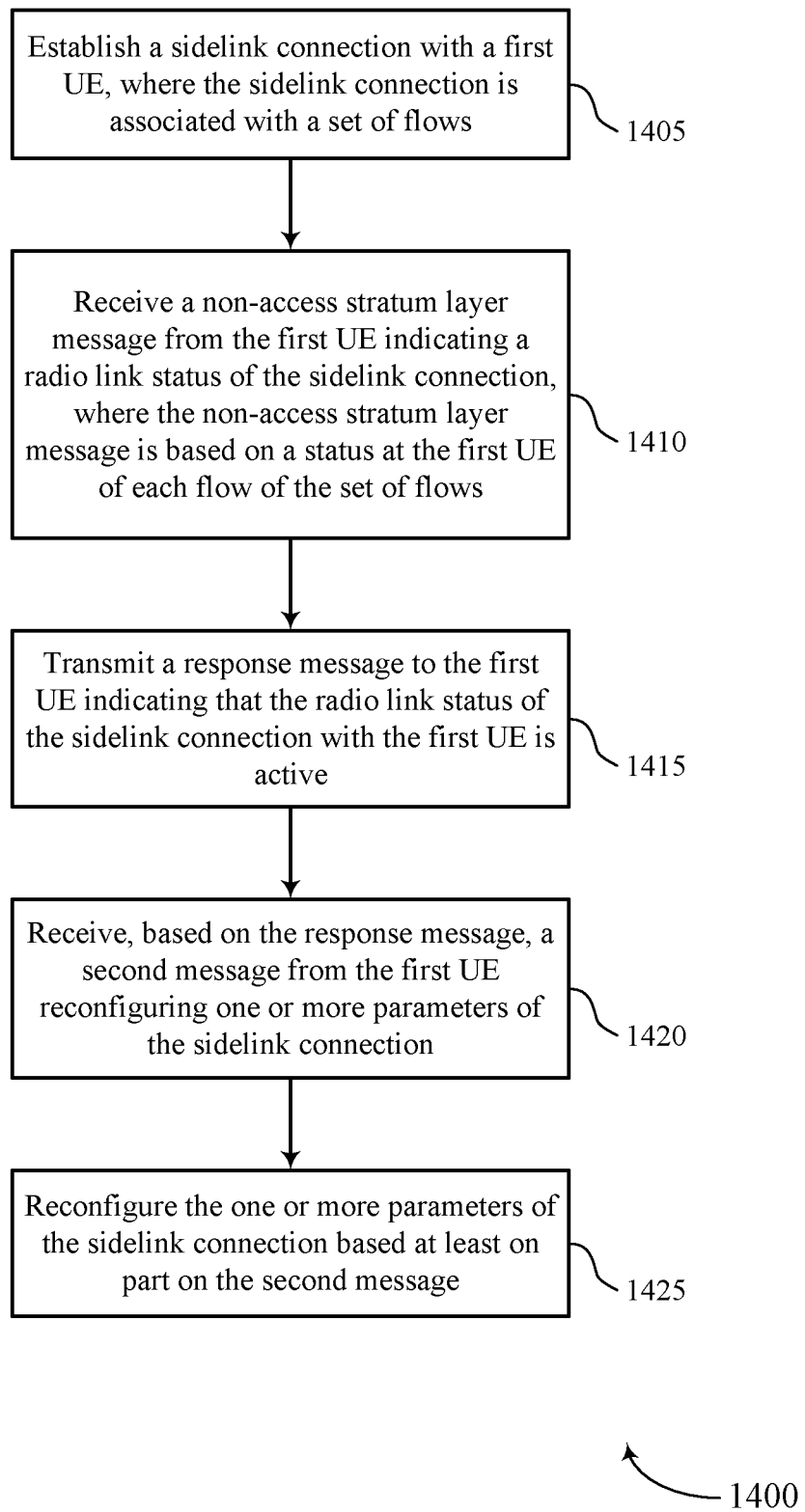

FIG. 14 shows a flowchart illustrating a method 1400 that supports unicast link RLF detection and management in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may establish a sidelink connection with a first UE, where the sidelink connection is associated with a set of flows. The operations of 1405 may be performed according to the methods described herein. In some examples, aspects of the operations of 1405 may be performed by a connection manager as described with reference to FIGS. 6 through 9.

At 1410, the UE may receive a non-access stratum layer message from the first UE indicating a radio link status of the sidelink connection, where the non-access stratum layer message is based on a status at the first UE of each flow of the set of flows. The operations of 1410 may be performed according to the methods described herein. In some examples, aspects of the operations of 1410 may be performed by a NAS layer message manager as described with reference to FIGS. 6 through 9.

At 1415, the UE may transmit a response message to the first UE indicating that the radio link status of the sidelink connection with the first UE is active. The operations of 1415 may be performed according to the methods described herein. In some examples, aspects of the operations of 1415 may be performed by a NAS layer message manager as described with reference to FIGS. 6 through 9.

At 1420, the UE may receive, based on the response message, a second message from the first UE reconfiguring one or more parameters of the sidelink connection. The operations of 1420 may be performed according to the methods described herein. In some examples, aspects of the operations of 1420 may be performed by a degraded link manager as described with reference to FIGS. 6 through 9.

At 1425, the UE may reconfigure the one or more parameters of the sidelink connection based at least on part on the second message. The operations of 1425 may be performed according to the methods described herein. In some examples, aspects of the operations of 1425 may be performed by a degraded link manager as described with reference to FIGS. 6 through 9.

The following provides an overview of aspects of the present disclosure:

Aspect 1: A method for wireless communication at a first UE, comprising: establishing a sidelink connection with a second UE, wherein the sidelink connection is associated with a plurality of flows; determining, based at least in part on monitoring each flow of the plurality of flows, a radio link status of the sidelink connection; and transmitting, based on the determining, a non-access stratum layer message to the second UE based at least on the radio link status of the sidelink connection.

Aspect 2: The method of aspect 1, further comprising: determining that no data is communicated across a first flow of the plurality of flows; and transmitting the non-access stratum layer message to the second UE, wherein the non-access stratum layer message comprises a keep-alive message requesting confirmation from the second UE that the radio link status of the sidelink connection is active.

Aspect 3: The method of aspect 2, wherein determining that no data is communicated comprises: determining that data communicated across the first flow fails to satisfy a quality of service requirement associated with the first flow.

Aspect 4: The method of any of aspects 2 through 3, wherein determining that no data is communicated comprises: determining that no data has been communicated across the first flow for a threshold time period associated with the first flow.

Aspect 5: The method of any of aspects 1 through 4, further comprising: receiving a response message from the second UE indicating that the radio link status of the sidelink connection with the second UE is active; and transmitting, based at least in part on the response message, a second message to the second UE reconfiguring one or more parameters of the sidelink connection.

Aspect 6: The method of aspect 5, wherein reconfiguring one or more parameters of the sidelink connection comprises: reconfiguring the sidelink connection from a first configuration to a second configuration from a set of available configurations configured for the sidelink connection.

Aspect 7: The method of any of aspects 5 through 6, wherein reconfiguring one or more parameters of the sidelink connection comprises: reconfiguring one or more quality of service parameters configured for the sidelink connection.

Aspect 8: The method of any of aspects 1 through 7, further comprising: determining, based at least in part on a lack of a response message from the second UE, that the radio link status of the sidelink connection with the second UE comprises a radio link failure; and performing, based at least in part on the radio link failure, a radio link failure recovery procedure to establish a second sidelink connection with the second UE.

Aspect 9: The method of any of aspects 1 through 8, further comprising: determining that no data is communicated across a first flow of the plurality of flows; determining that data is communicated across a second flow of the plurality of flows; determining that the radio link status of the sidelink connection comprises a degraded radio link status; and transmitting a second message to the second UE reconfiguring one or more parameters of the sidelink connection.

Aspect 10: The method of aspect 9, wherein reconfiguring one or more parameters of the sidelink connection comprises: reconfiguring the sidelink connection from a first configuration to a second configuration from a set of available configurations configured for the sidelink connection.

Aspect 11: The method of any of aspects 9 through 10, wherein reconfiguring one or more parameters of the sidelink connection comprises: reconfiguring one or more quality of service parameters configured for the sidelink connection.

Aspect 12: The method of any of aspects 1 through 11, further comprising: determining that the non-access stratum layer message was transmitted within a threshold time period; and refraining from transmitting a second non-access stratum layer message to the second UE based at least on the non-access stratum layer message.

Aspect 13: The method of any of aspects 1 through 12, wherein determining the radio link status of the sidelink connection comprises: determining, for each flow of the plurality of flows, whether data communicated across each flow satisfies a quality of service requirement configured for the flow.

Aspect 14: The method of any of aspects 1 through 13, wherein the non-access stratum layer message comprises a PC5 sidelink (PC5-S) message.

Aspect 15: A method for wireless communication at a second UE, comprising: establishing a sidelink connection with a first UE, wherein the sidelink connection is associated with a plurality of flows; receiving a non-access stratum layer message from the first UE indicating a radio link status of the sidelink connection, wherein the non-access stratum layer message is based at least in part on a status at the first UE of each flow of the plurality of flows; and transmitting a response message to the first UE indicating that the radio link status of the sidelink connection with the first UE is active.

Aspect 16: The method of aspect 15, further comprising: receiving, based at least in part on the response message, a second message from the first UE reconfiguring one or more parameters of the sidelink connection; and reconfiguring the one or more parameters of the sidelink connection based at least on part on the second message.

Aspect 17: The method of aspect 16, wherein reconfiguring one or more parameters of the sidelink connection comprises: reconfiguring the sidelink connection from a first configuration to a second configuration from a set of available configurations configured for the sidelink connection.

Aspect 18: The method of any of aspects 16 through 17, wherein reconfiguring one or more parameters of the sidelink connection comprises: reconfiguring one or more quality of service parameters configured for the sidelink connection.

Aspect 19: The method of any of aspects 15 through 18, wherein the non-access stratum layer message comprises a keep-alive message requesting confirmation from the second UE that the radio link status of the sidelink connection is active.

Aspect 20: An apparatus for wireless communication at a first UE, comprising a processor; memory coupled with the processor; and instructions stored in the memory and executable by the processor to cause the apparatus to perform a method of any of aspects 1 through 14.

Aspect 21: An apparatus for wireless communication at a first UE, comprising at least one means for performing a method of any of aspects 1 through 14.

Aspect 22: A non-transitory computer-readable medium storing code for wireless communication at a first UE, the code comprising instructions executable by a processor to perform a method of any of aspects 1 through 14.

Aspect 23: An apparatus for wireless communication at a second UE, comprising a processor; memory coupled with the processor; and instructions stored in the memory and executable by the processor to cause the apparatus to perform a method of any of aspects 15 through 19.

Aspect 24: An apparatus for wireless communication at a second UE, comprising at least one means for performing a method of any of aspects 15 through 19.

Aspect 25: A non-transitory computer-readable medium storing code for wireless communication at a second UE, the code comprising instructions executable by a processor to perform a method of any of aspects 15 through 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    establishing a sidelink connection with a second UE, wherein the sidelink connection is associated with a plurality of flows;
    determining, based at least in part on monitoring each flow of the plurality of flows, a radio link status of the sidelink connection;
    transmitting, based on the determining, a non-access stratum layer message to the second UE based at least on the radio link status of the sidelink connection; and
    transmitting a second message to the second UE reconfiguring one or more parameters of the sidelink connection, wherein reconfiguring the one or more parameters of the sidelink connection comprises reconfiguring the sidelink connection from a first configuration to a second configuration from a set of available configurations configured for the sidelink connection or reconfiguring one or more quality of service parameters configured for the sidelink connection.

2. The method of claim 1, further comprising:
    determining that no data is communicated across a first flow of the plurality of flows; and
    transmitting the non-access stratum layer message to the second UE, wherein the non-access stratum layer message comprises a keep-alive message requesting confirmation from the second UE that the radio link status of the sidelink connection is active.

3. The method of claim 1, further comprising:
    receiving a response message from the second UE indicating that the radio link status of the sidelink connection with the second UE is active, wherein transmitting the second message to the second UE reconfiguring one or more parameters of the sidelink connection is based at least in part on receiving the response message.

4. The method of claim 1, further comprising:
    determining, based at least in part on a lack of a response message from the second UE, that the radio link status of the sidelink connection with the second UE comprises a radio link failure; and
    performing, based at least in part on the radio link failure, a radio link failure recovery procedure to establish a second sidelink connection with the second UE.

5. The method of claim 2, wherein determining that no data is communicated comprises:
    determining that data communicated across the first flow fails to satisfy a quality of service requirement associated with the first flow.

6. The method of claim 2, wherein determining that no data is communicated comprises:
    determining that no data has been communicated across the first flow for a threshold time period associated with the first flow.

7. The method of claim 1, further comprising:
determining that no data is communicated across a first flow of the plurality of flows;
determining that data is communicated across a second flow of the plurality of flows; and
determining that the radio link status of the sidelink connection comprises a degraded radio link status, wherein transmitting the second message to the second UE reconfiguring one or more parameters of the sidelink connection is based at least in part on the degraded radio link status.

8. The method of claim 1, further comprising:
determining that the non-access stratum layer message was transmitted within a threshold time period; and
refraining from transmitting a second non-access stratum layer message to the second UE based at least on the non-access stratum layer message.

9. The method of claim 1, wherein determining the radio link status of the sidelink connection comprises:
determining, for each flow of the plurality of flows, whether data communicated across each flow satisfies a quality of service requirement configured for the flow.

10. The method of claim 1, wherein the non-access stratum layer message comprises a PC5 sidelink (PC5-S) message.

11. A method for wireless communication at a second user equipment (UE), comprising:
establishing a sidelink connection with a first UE, wherein the sidelink connection is associated with a plurality of flows;
receiving a non-access stratum layer message from the first UE indicating a radio link status of the sidelink connection, wherein the non-access stratum layer message is based at least in part on a status at the first UE of each flow of the plurality of flows;
transmitting a response message to the first UE indicating that the radio link status of the sidelink connection with the first UE is active;
receiving, based at least in part on the response message, a second message from the first UE reconfiguring one or more parameters of the sidelink connection; and
reconfiguring the one or more parameters of the sidelink connection based at least on part on the second message, wherein reconfiguring the one or more parameters of the sidelink connection comprises reconfiguring the sidelink connection from a first configuration to a second configuration from a set of available configurations configured for the sidelink connection or reconfiguring one or more quality of service parameters configured for the sidelink connection.

12. The method of claim 11, wherein the non-access stratum layer message comprises a keep-alive message requesting confirmation from the second UE that the radio link status of the sidelink connection is active.

13. An apparatus for wireless communication at a first user equipment (UE), comprising:
a processor,
memory coupled with the processor; and
instructions stored in the memory and executable by the processor to cause the apparatus to:
establish a sidelink connection with a second UE, wherein the sidelink connection is associated with a plurality of flows;
determine, based at least in part on monitoring each flow of the plurality of flows, a radio link status of the sidelink connection;
transmit, based on the determining, a non-access stratum layer message to the second UE based at least on the radio link status of the sidelink connection; and
transmit a second message to the second UE reconfiguring one or more parameters of the sidelink connection, wherein reconfiguring the one or more parameters of the sidelink connection comprises reconfiguring the sidelink connection from a first configuration to a second configuration from a set of available configurations configured for the sidelink connection or reconfiguring one or more quality of service parameters configured for the sidelink connection.

14. The apparatus of claim 13, wherein the instructions are further executable by the processor to cause the apparatus to:
determine that no data is communicated across a first flow of the plurality of flows; and
transmit the non-access stratum layer message to the second UE, wherein the non-access stratum layer message comprises a keep-alive message requesting confirmation from the second UE that the radio link status of the sidelink connection is active.

15. The apparatus of claim 14, wherein the instructions are further executable by the processor to cause the apparatus to:
receive a response message from the second UE indicating that the radio link status of the sidelink connection with the second UE is active, wherein transmitting the second message to the second UE reconfiguring one or more parameters of the sidelink connection is based at least in part on receiving the response message.

16. The apparatus of claim 14, wherein the instructions are further executable by the processor to cause the apparatus to:
determine, based at least in part on a lack of a response message from the second UE, that the radio link status of the sidelink connection with the second UE comprises a radio link failure; and
perform, based at least in part on the radio link failure, a radio link failure recovery procedure to establish a second sidelink connection with the second UE.

17. The apparatus of claim 14, wherein the instructions to determine that no data is communicated are executable by the processor to cause the apparatus to:
determine that data communicated across the first flow fails to satisfy a quality of service requirement associated with the first flow.

18. The apparatus of claim 14, wherein the instructions to determine that no data is communicated are executable by the processor to cause the apparatus to:
determine that no data has been communicated across the first flow for a threshold time period associated with the first flow.

19. The apparatus of claim 13, wherein the instructions are further executable by the processor to cause the apparatus to:
determine that no data is communicated across a first flow of the plurality of flows;
determine that data is communicated across a second flow of the plurality of flows; and
determine that the radio link status of the sidelink connection comprises a degraded radio link status, wherein transmitting the second message to the second UE reconfiguring one or more parameters of the sidelink connection is based at least in part on the degraded radio link status.

20. The apparatus of claim 13, wherein the instructions are further executable by the processor to cause the apparatus to:
    determine that the non-access stratum layer message was transmitted within a threshold time period; and
    refrain from transmitting a second non-access stratum layer message to the second UE based at least on the non-access stratum layer message.

21. The apparatus of claim 13, wherein the instructions to determine the radio link status of the sidelink connection are executable by the processor to cause the apparatus to:
    determine, for each flow of the plurality of flows, whether data communicated across each flow satisfies a quality of service requirement configured for the flow.

22. The apparatus of claim 13, wherein the non-access stratum layer message comprises a PC5 sidelink (PC5-S) message.

23. An apparatus for wireless communication at a second user equipment (UE), comprising:
    a processor,
    memory coupled with the processor; and
    instructions stored in the memory and executable by the processor to cause the apparatus to:
        establish a sidelink connection with a first UE, wherein the sidelink connection is associated with a plurality of flows;
        receive a non-access stratum layer message from the first UE indicating a radio link status of the sidelink connection, wherein the non-access stratum layer message is based at least in part on a status at the first UE of each flow of the plurality of flows;
        transmit a response message to the first UE indicating that the radio link status of the sidelink connection with the first UE is active;
        receive, based at least in part on the response message, a second message from the first UE reconfiguring one or more parameters of the sidelink connection; and
        reconfigure the one or more parameters of the sidelink connection based at least on part on the second message, wherein reconfiguring the one or more parameters of the sidelink connection comprises reconfiguring the sidelink connection from a first configuration to a second configuration from a set of available configurations configured for the sidelink connection or reconfiguring one or more quality of service parameters configured for the sidelink connection.

24. The apparatus of claim 23, wherein the non-access stratum layer message comprises a keep-alive message requesting confirmation from the second UE that the radio link status of the sidelink connection is active.

\* \* \* \* \*